(12) United States Patent
Henry et al.

(10) Patent No.: US 7,107,176 B2
(45) Date of Patent: Sep. 12, 2006

(54) SENSOR FUSION USING SELF EVALUATING PROCESS SENSORS

(75) Inventors: Manus P. Henry, Oxford (GB); Mihaela D. Duta, Oxford (GB)

(73) Assignee: Invensys systems, Inc., Foxboro, MA (US)

(*) Notice: Subject to any disclaimer, the term of this patent is extended or adjusted under 35 U.S.C. 154(b) by 5 days.

(21) Appl. No.: 10/178,893

(22) Filed: Jun. 25, 2002

(65) Prior Publication Data

US 2003/0088381 A1 May 8, 2003

Related U.S. Application Data

(60) Provisional application No. 60/300,094, filed on Jun. 25, 2001.

(51) Int. Cl.
*G06F 19/00* (2006.01)
(52) U.S. Cl. .................................................. 702/127
(58) Field of Classification Search ................ 702/127, 702/81, 2, 8, 116, 128, 188, 65; 435/287; 451/5; 340/605, 442, 568; 600/587, 595, 600/572; 175/24; 209/564; 19/239; 73/572, 73/1; 376/245, 216, 256; 700/30, 179, 83; 131/280
See application file for complete search history.

(56) References Cited

U.S. PATENT DOCUMENTS

| 4,926,364 | A | | 5/1990 | Brotherton |
| 5,570,300 | A | * | 10/1996 | Henry et al. ................... 702/45 |
| 5,586,066 | A | | 12/1996 | White et al. |
| 5,680,409 | A | | 10/1997 | Qin et al. |
| 5,774,378 | A | | 6/1998 | Yang |
| 5,850,625 | A | | 12/1998 | Maren et al. |
| 6,047,220 | A | | 4/2000 | Eryurek |
| 6,580,046 | B1 | * | 6/2003 | Koini et al. ................. 209/564 |
| 6,772,082 | B1 | * | 8/2004 | van der Geest et al. .... 702/116 |
| 2002/0042694 | A1 | * | 4/2002 | Henry et al. ................. 702/188 |
| 2003/0167139 | A1 | * | 9/2003 | Swartz et al. ................. 702/65 |

FOREIGN PATENT DOCUMENTS

| EP | 0827096 | 3/1998 |
| WO | WO 93/21505 | 10/1993 |
| WO | WO 00/10059 | 2/2000 |

OTHER PUBLICATIONS

M. Henry, Self-Validating Digital Coriolis Mass Flow Meter, (Oct. 2000), Computing & Control Engineering Journal.
G. Wood, UK Activities in Measurement Validation and Data Quality, (Oct. 2000), Computing & Control Engineering Journal.

(Continued)

*Primary Examiner*—Bryan Bui
*Assistant Examiner*—Tung S. Lau
(74) *Attorney, Agent, or Firm*—Fish & Richardson P.C.

(57) ABSTRACT

A measurement processing system is disclosed for fusing measurement data from a set of independent self-validating (SEVA™) process sensors monitoring the same real-time measurand in order to generate a combined best estimate for the value, uncertainty and measurement status of the measurand. The system also provides consistency checking between the measurements. The measurement processing system includes a first process sensor and a second process sensor. Each of the first and second process sensors receive a measurement signal from a transducer and generate independent process metrics. A measurement fusion block is connected to the first and second process sensors, the measurement fusion block is operable to receive the independent process metrics and execute a measurement analysis process to analyze the independent process metrics and generate the combined best estimate of the independent process metrics.

32 Claims, 14 Drawing Sheets

OTHER PUBLICATIONS

M. Henry, Plant Asset Management Via Intelligent Sensors Digital, Distributed and For Free, Oct. 2000, Computing & Control Engineering Journal.

J.C.-Y. Yang & D.W. Clarke, Control Using Self-Validating Sensors, vol. 18, No. 1, (1996), Trans. Inst. MC.

M.P. Henry & D.W. Clarke, The Self-Validating Sensor: Rationale, Definitions and Examples, vol. 1, No. 4, pp. 585-610, (1993), Control Eng. Practice.

M. P. Henry, The Integration of Fault Detection Within Plant-Wide Data Quality Management. vol. 2, Jun. 13-16, (1994), IFAC-Safeprocess 94.

U. Enste & F. Uecker, The Use of Supervisory Information in Process Control, (Oct. 2000), IEE Computing & Control.

J. C. Yang & D.W. Clarke, The Self-Validating Actuator, vol. 7, pp. 249-260. (1999), Control Engineering Practice.

J. K. Hackett & M. Shah, Multi-Sensor Fusion: A Perspective, (1990), IEEE.

R.C. Luo & M. G. Kay, A Tutorial on Multisensor Integration and Fusion, (1990), IEEE.

M.P. Manus, Self-Validating, (Jun. 2001) Control Engineering Europe.

L. Mari & G. Zingales, Uncertainty in Measurement Science.

M. P. Henry, "A Seva Sensor—The Coriolis Mass Flow Meter," IFAC Fault Detection, Supervision and Safety for Technical Processes, vol. 2, pp. 429-434, 1994.

Atia et al.; "A Self-Validating Temperature Sensor Implemented in FPGAs"; Proceedings of the 5th International Workshop on Field Programmable Logic and Applications; pp. 321-330; 1995.

Kresta et al.; "Multivariate Statistical Monitoring of Process Operating Performance", Chemical Engineering Dept., McMaster Univ. Ontario, vol. Feb. 1991, pp. 35-47.

MacGregor et al., "Statistical Process Control of Multivariate Processes", Chemical Engineering Dept., McMaster Advanced Control Consortium, McMaster Univ. vol. 3, No. 3, 1995, pp. 403-414.

MacGregor J. F. et al., 1991, "Multivariate Statistical Methods in Process Analysis and Control." AtChE Symposium Proceedings of the Fourth International Conference on Chemical Process Control, AlChE Pub. No. P-67, New York, pp. 79-99.

McFarlane R.C. et al., "Dynamic Simulator for a Model IV Fluid Catalytic Cracking Unit," American Institute of Chemical Engineering, Chicago, IL, Nov. 14, 1990, pp. 1-79.

Morud T.E., 1996, "Multivariate Statistical Process Control"; Example from the Chemical Process Industry, *Journal of Chemometrics*, vol. 10, Nos. 5 & 6, pp. 669-675.

Qin et al., "Self-Validating Inferential Sensor for Emission Monitoring", Dept. of Chemical Engineering, Univ. of Texas, Jun. 1997, pp. 473-477.

Yang J.C.-Y; 1994, "Self-validating Sensors", Dr. of Phil. Thesis, Department of Engineering Science, Univ. of Oxford.

Sheung Kai Yung, "Signal Processing in Local Sensor Validation," Ph.D. Thesis—University of Oxford, Dept. of Engin. Science, 1993, pp. 1-244 with Table Of Contents and Abstract.

U.S. Appl. No. 09/815,275, filed Mar. 23, 2001.

S. J. Kline et al., "Describing Uncertainties in Single-Sample Experiments", Mechanical Engineering, pp. 3-8, 1853.

Paul M. Frank, "Fault Diagnosis in Dynamic Systems Using Analytical and Knowledge-based Redundancy—A Survey and Some New Results," Automatica, vol. 26, No. 3, pp. 459-474, 1990.

R. J. Moffat, "Contributions to the Theory of Single-Sample Uncertainty Analysis", ASME Journal of Fluid Engineering, vol. 104, pp. 250-260, 1982.

* cited by examiner

1 Initialisation
    1.1 *Compute* $d_M^{i,j}$ for all $i$ and $j = i+1, 2, ..., n$
    1.2 *Build up* the measurement graph
2 Search for maximum cliques
    2.1 *Start* with $p = n$
    2.2 *While* no clique is found and $p > 1$
        2.2.1 *Build* the tree of all possible combinations of $n$ nodes taken in sets of $p$
        2.2.2 · *Visit* the entire tree and record all cliques
        2.2.3 $p = p - 1$; goto 2.2

FIG. 6

1 Initialisation
  1.1 *Compute* $l_i$ and $h_i$, $i = 1, 2, \ldots, n$
  1.2 *Build up* boundlist $Z$ of triplets:
    $z_j = \{bound_j, index_j, type_j\}$
    *where* $z_{2i} = \{l_i, i, lower\}$
    *and* $z_{2i+1} = \{h_i, i, upper\}$
  1.3 *Sort* the bound list by bound value $z_j.bound$ 2 Search the bound list for maximum areas of overlap
  2.1 *Start*: $p = 0$, $maxp = 0$,
     $active\_meas = \Phi$ and $clique\_list = \Phi$
  2.2 *For* $j = 1 : 2n$ *do*
    2.2.1 *If* $z_j.type = lower$
      *then* add $z_j.index$ to $active\_meas$
      and $p = p + 1$
    2.2.2 *If* $z_j.type = upper$
      *then* remove $z_j.index$ from $active\_meas$
      and $p = p - 1$
    2.2.3 *If* $p = maxp$
      *then* append $active\_meas$ to $clique\_list$
    2.2.4 *If* $p > maxp$
      *then* $active\_meas = \{clique\_list\}$
      and $maxp = p$

FIG. 8

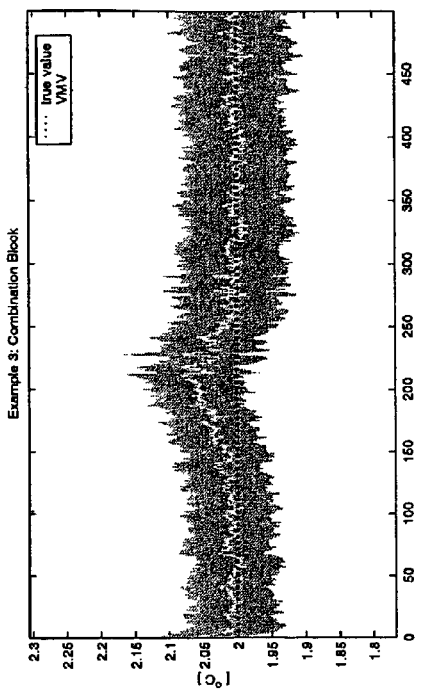
FIG. 12A
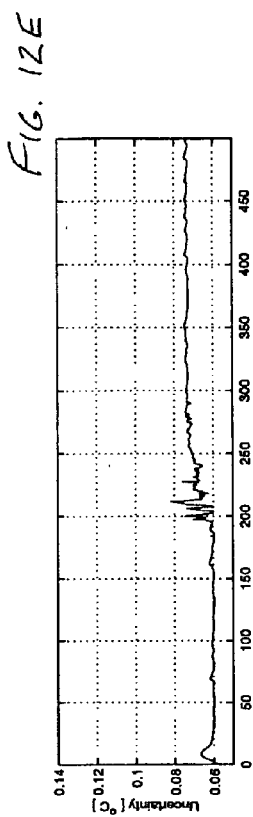
FIG. 12B
FIG. 12C
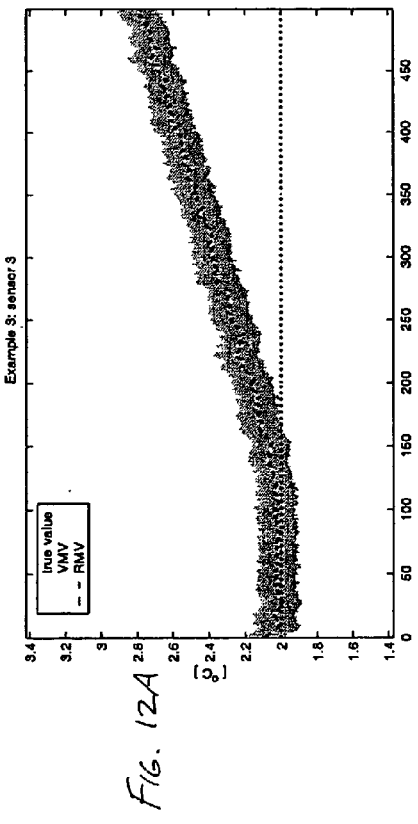
FIG. 12D
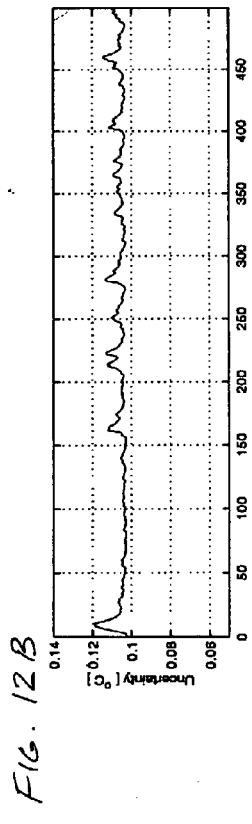
FIG. 12E
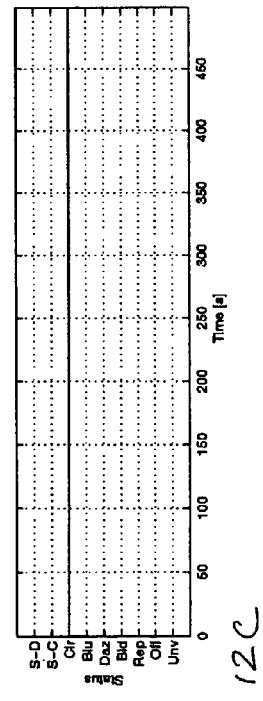
FIG. 12F

SENSOR FUSION USING SELF EVALUATING PROCESS SENSORS

CROSS REFERENCE TO RELATED APPLICATION

This application claim priority from U.S. Provisional Application No. 60/300,094, filed Jun. 25, 2001 now abandoned, and titled SENSOR FUSION USING SEVA, which is incorporated by reference.

TECHNICAL FIELD

This invention relates to processing data from a sensor, and more particularly to combining and interpreting sensor data from multiple process sensors to improve system control.

BACKGROUND

Process sensors are used in a wide range of industrial process control applications. A process sensor or transmitter is a device having one or more transducers and electronics that convert transducer signals into a measurement value recognizable by an associated process control or monitoring system. The measurement value may be used as a process variable by the process control system. Increasingly, local computing power has been used to carry out internal diagnostics within "intelligent" sensors such as self validating (SEVA™) process sensors. A SEVA™ process sensor is a type of intelligent process sensor that performs additional processing to generate information including generic validity metrics for each measurement produced by the sensor. The metrics generated by a SEVA™ process sensor include, for example, a validated measurement value (VMV), a validated uncertainty (VU) of the measurement value, and a measurement value status (MV status). These SEVA™ process metrics represent the quality and confidence for each measurement produced by the process sensor. Additional description of the SEVA™ standard can be found in British Standard BS7986:2001, titled Specifications for Data Quality Metrics for Industrial Measurement and Control Systems, which is incorporated herein by reference.

Specifically, the validated measurement value (VMV) is the SEVA™ process sensor's best estimate of the true measurand value of the process variable, taking all diagnostic information into account. If a fault occurs, then the VMV can be corrected to the best ability of the SEVA™ sensor, and additional information can be generated by the sensor to alert the process control system of the fault. In the most severe cases, such as where the raw data is judged to have no correlation with the measurand, the VMV can be extrapolated entirely from past measurement behavior.

The validated uncertainty (VU) is the uncertainty associated with the VMV. The VU gives a confidence interval for the true value of the measurand. For example, if VMV as determined by the process sensor is 2.51 units, and the VU is 0.08, then there is a 95% chance that the true measurement lies within the interval 2.51±0.08 units. The VU takes into account all likely sources of error, including noise, measurement technology and any fault-correction strategy being used by the process sensor. When a fault is detected, the SEVA™ sensor has the ability to correct the VMV and increase the VU to account for the reduction in the confidence of the reading.

The measurement value status (MV status) is a discrete-valued flag indicating how the VMV has been calculated by the process sensor. The MV status also reflects the presence and the persistence of any process sensor fault. The MV status assists users (whether human or automated) to determine whether the measurement is acceptable for use in a particular application. For example, measurement data given a BLIND status should never be used for feedback control, as BLIND data is projected from past measurement value history and will not respond to the actions of feedback control.

The MV status flag generated by the process sensor can take on any one of a set of discrete values. For example, possible values for the MV status flag in one implementation include CLEAR, BLURRED, DAZZLED, BLIND, SECURE DIVERSE, SECURE COMMON, and UNVALIDATED. When the MV status is CLEAR, confidence in the raw measurement is nominal, and the VMV is generated purely from the current raw measurement. When the MV status is BLURRED, a fault that impairs measuring capability has been diagnosed, and the VMV is generated by compensating the current raw measurement. When the MV status is DAZZLED, the raw measurement is substantially abnormal and the confidence associated with it is zero, but the fault is judged to be temporary, such as during a transient period. During this condition, the VMV is generated from the sensor's measurement value history associated with the device. When the MV status is BLIND, a fault that destroys the measuring capability of the process sensor has been diagnosed, and there is no confidence in the raw measurement. During this condition, the VMV is generated from the sensor's measurement history associated with the device. When the MV status is SECURE DIVERSE or SECURE COMMON, the VMV is obtained by combining redundant SEVA™ measurements, and the confidence in each SEVA™ measurement is nominal. When the MV status is UNVALIDATED, validation within the SEVA™ process sensor is not currently taking place.

An automated process control system in an industrial processing system may receive process variables as measurement values from a variety of sensors and actuators that monitor and assist in the operation of the industrial processing system. The process variables are generated by process sensors or transmitters that transmit the process variables to the process control system over a communication channel or network. A variety of communication approaches currently exist for transmitting the process variables. These approaches range from low bandwidth analog communication channels, such as analog, pulse, alarm status, and 4–20 mA, to higher bandwidth digital communication channels, such as fieldbus or the FoxCom communication protocol available from Invensys Systems, Inc. Currently there exist many installed process control systems that receive process variable information (as feedback) generated by process sensors connected to low bandwidth communication channels. These systems typically use non-SEVA™ sensors and are limited in the amount of process variable information that can be communicated over the low bandwidth network from the process sensors to the process control system. For example, some process control systems are only capable of receiving binary input information such as the state of an alarm signal being on or off, or a 4–20 mA signal representing the measured process variable. Therefore, these low bandwidth systems are typically not capable of communicating the higher bandwidth process variable information associated with a digital SEVA™ process sensor. Moreover, many existing automated process control systems are not able to process the metrics generated by a SEVA™ process sensor, and merely rely upon non-SEVA™ sensors generating alarm signals when faults occur in the industrial processing system.

In the absence of localized process variable validation (such as through an intelligent SEVA™ process sensor), measurement redundancy has been used to ensure that a verified and reliable measurement of the process variable is provided to the process control system with high availability, such that a fault or failure associated with one process sensor doesn't result in complete loss of the measurement to the process control system. Such redundancy may be implemented through the use of several independent sensors that monitor the same process variable, usually termed hardware redundancy, or through a plant model that provides an independent estimate of the process variable, usually termed analytical redundancy.

SUMMARY

Validation techniques that perform consistency checking and fusion of redundant SEVA™ measurements are described. The SEVA™ sensor model assumes that the process sensor is capable of detecting the most important fault modes associated with the process sensor. However, there remains a non-zero probability that a fault may go undetected for a significant period of time. Thus, it is desirable in certain SEVA™ process sensor applications to use a higher level validation technique to perform consistency checking and process measurement fusion of redundant SEVA™ measurements.

One technique for analyzing the consistency of two independent SEVA™ measurements is to calculate a Moffat consistency value and then determine whether the combined best estimate of the two measurements is within an uncertainty of each of the independent measurements.

Another technique for combining and checking the consistency of three or more SEVA™ measurements is to solve the maximum clique problem. Given a set of arcs and nodes, the goal is to find the maximum subset of nodes, the clique, with the property that each node is connected with the other nodes. Finding the maximum clique can be achieved by performing an exhaustive search, or may be achieved by way of a linear search using overlapping intervals. The next step involves forming two subsets. The first subset is the core set, or the consistent set of measurements. The second subset is the peripheral set, or the remaining measurements.

The process of sensor fusion is to achieve a specific task through the synergistic use of a set of not necessarily consistent SEVA™ measurements from independent SEVA™ sensors that are monitoring the same real-time measurand. Such tasks may include generating a combined best estimate (CBE), uncertainty, and measurement status for the measured value.

In one aspect, a measurement fusion module receives multiple estimates of the same process parameter, each provided by any one of a sensor or a model of the process parameter based on process knowledge, and where appropriate other measurement values. In either case the SEVA™ process metrics may be generated as an integral part of the process sensor or model, or assigned by a subsequent processing stage to the raw outputs of the process sensor or model. In addition, the same technique also may be applied within a single SEVA™ process sensor that uses multiple transducers to estimate the value of the process parameter.

In another aspect, a measurement processing system includes a first process sensor and a second process sensor. Each of the first and second process sensors receive a measurement signal from a transducer and generate independent process metrics. A measurement fusion block is connected to the first and second process sensors, the measurement fusion block is operable to receive the independent process metrics and execute a measurement analysis process to analyze the independent process metrics and generate a combined best estimate of the independent process metrics.

The measurement analysis process may analyze the independent process metrics to determine whether the independent process metrics are consistent with each other. The measurement analysis process also may analyze the independent process metrics to identify a consistent set of process metrics. The measurement analysis process also may analyze the independent process metrics to identify outliers within the set of independent process metrics.

The measurement fusion block may include a consistency analysis module operable to execute a consistency analysis process, where the consistency analysis process analyzes the independent process metrics to determine whether the process metrics are consistent with each other. The measurement fusion block may include a sensor fusion module operable to analyze the independent process metrics and combine the independent process metrics to generate a combined best estimate of the independent process metrics.

The consistency analysis process may receive two independent process metrics and calculates a Moffat consistency value to determine whether the two independent process metrics are consistent. Alternatively, the consistency analysis process may receive two independent process metrics and analyzes an overlap interval between the two independent process metrics to determine whether the two independent process metrics are consistent.

The consistency analysis process may receive at least three independent process metrics and calculate a maximum clique parameter based on a linear search of the independent process metrics to determine how many of the at least three independent process metrics are mutually consistent.

The consistency analysis process may receive at least three independent process metrics and calculate a maximum clique parameter based on an exhaustive search of the independent process metrics to determine how many of the at least three independent process metrics are mutually consistent.

The process metrics may include measurement data and uncertainty data. The process metrics also may include a measurement status variable. The first and second process sensors may be first and second SEVA™ sensors. The first and second SEVA™ sensors may generate independent SEVA™ metrics.

Each independent SEVA™ metric and the combined best estimate of the independent process metrics may include a validated measurement value, a validated uncertainty parameter associated with the validated measurement value, and a measurement value status indicator. The measurement fusion block may receive the independent process metrics and generate a combined best estimate value representing a set of fused process metrics and communicates the combined best estimate value to a control system.

A third process sensor may be connected to the measurement fusion block where the third process sensor receives a measurement signal from a transducer and generates a third process metric. The third process sensor may communicate the third process metric to the measurement fusion block. The measurement analysis process may analyze the independent process metrics and the third process metric to determine whether the independent process metrics and the third process metric are consistent with each other. The measurement analysis process may combine the independent process metrics with the third process metric to generate a combined best estimate of the independent process metrics and the third process metric.

One of the first and second process sensors may be a multivariable transmitter that generates at least two similar independent process metrics from measurement signals received from independent transducers monitoring the same process variable.

One of the first and second process sensors may be a multivariable transmitter that generates three independent process metrics where at least two of the three independent process metrics are generated from measurement signals received from independent transducers monitoring the same process variable.

The first and second process sensors may be multivariable transmitters that generate the independent process metrics from measurement signals received from independent transducers monitoring the same process variable.

In another aspect, a measurement fusion block includes a consistency analysis module operable to receive a first process metric from a first process sensor and receive a second process metric from a second process sensor. The consistency analysis module is configured to execute a consistency analysis process on the first and second process metrics to determine whether the first and second process metrics are consistent with each other. A sensor fusion module is operable to receive the first and second process metrics. The sensor fusion module is configured to execute a sensor fusion process to combine the first and second process metrics and generate a combined best estimate of the first and second process metrics.

The consistency analysis process may calculate a Moffat consistency value to determine whether the first and second process metrics are consistent. The consistency analysis process may analyze an overlap interval between the first and second process metrics to determine whether the first and second process metrics are consistent.

The consistency analysis process may receive at least three independent process metrics and calculate a maximum clique parameter based on a linear search of the independent process metrics to determine how many of the at least three independent process metrics are mutually consistent.

The first and second process metrics may include measurement data and uncertainty data. The first and second process metrics also may include a measurement status variable.

The measurement fusion block may include a processor operable to execute an uncertainty augmentation process to modify an uncertainty parameter associated with one or more of the process metrics.

In another aspect, a method of combining process measurement data includes providing two or more process metrics from independent process sensors to form a set of process metrics, analyzing the process metrics within the set of process metrics to determine a consistency relationship between the process metrics, identifying outliers within the set of process metrics, and generating a set of consistent process metrics from the set of process metrics. The method also includes combining the process metrics within the set of consistent process metrics to generate a combined best estimate for the set of process metrics, generating an uncertainty value associated with the combined best estimate, and outputting the combined best estimate for the set of process metrics with the uncertainty value. Identifying outliers also may include modifying process metrics identified as outliers by increasing an uncertainty value associated with that process metric.

The method also may include applying an uncertainty augmentation process to modify an uncertainty parameter associated with one or more of the process metrics. The method also may include generating a consistency flag variable for each process metric within the set of process metrics.

In another aspect, a multivariable transmitter operates in association with the measurement fusion block. The fusion block may be a separate processing module, or may be integrated within the multivariable transmitter. A multivariable transmitter is a type of process sensor that has multiple transducers and generates more than one process variable measurement. One multivariable transmitter may generate two or more independent measurements of the same measurand (e.g., temperature), with each measurement being derived from a different transducer. The independent measurements may be of the same type (e.g., two independent temperature measurements), or may be of different (e.g., two temperature measurements and one pressure measurement).

An exemplary process control system may be set up to monitor several process variables associated with a catalytic processing vessel. The process control system may need to receive validated temperature measurements taken from the catalytic processing vessel at predetermined time intervals in order to monitor and control the catalytic process. In order to provide more accurate temperature measurements, two multivariable transmitters may be connected to the processing vessel, each producing two temperature measurements. A measurement fusion block may be used to receive and process the four independent temperature measurements, two from each multivariable transmitter.

The fusion block processes the independent measurements (of the same type) to determine whether they are consistent with each other, to identify a set of consistent measurements, and to perform a measurement fusion process to generate a combined best estimate of the measurements.

In another aspect, a measurement interpretation block includes a processing module configured to receive a process metric from a process sensor. The processing module executes a transformation process for mapping the process metric to a process parameter. An output module is configured to receive the process parameter and generate an output signal representing the process parameter.

The measurement interpretation may include a memory module configured to store rules applied by the transformation process. The transformation process may compare the process metric to a threshold parameter for mapping the process metric to a process parameter.

The process metric received by the measurement interpretation block may include measurement data and uncertainty data. The process metric received by the measurement interpretation block also may include a measurement status variable The process sensor associated with the measurement interpretation block may be a SEVA™ process sensor configured to generate SEVA™ process metrics. The output signal generated by the output module may be one of a 4–20 mA signal, a pulse signal, and an alarm signal.

The details of one or more implementations are set forth in the accompanying drawings and the description below. Other features will be apparent from the description and drawings, and from the claims.

DESCRIPTION OF DRAWINGS

FIG. 6 is a pseudo-code listing of an exhaustive search process for determining the maximum clique.

FIG. 8 is a pseudo-code listing of a linear search process for approximating the maximum clique.

FIGS. 12A–12C are graphs of process metrics from a SEVA™ process sensor producing an incorrect representation of the measurand and a measurement fusion block associated with a third example.

Like reference symbols in the various drawings indicate like elements.

DETAILED DESCRIPTION

Figure 1:
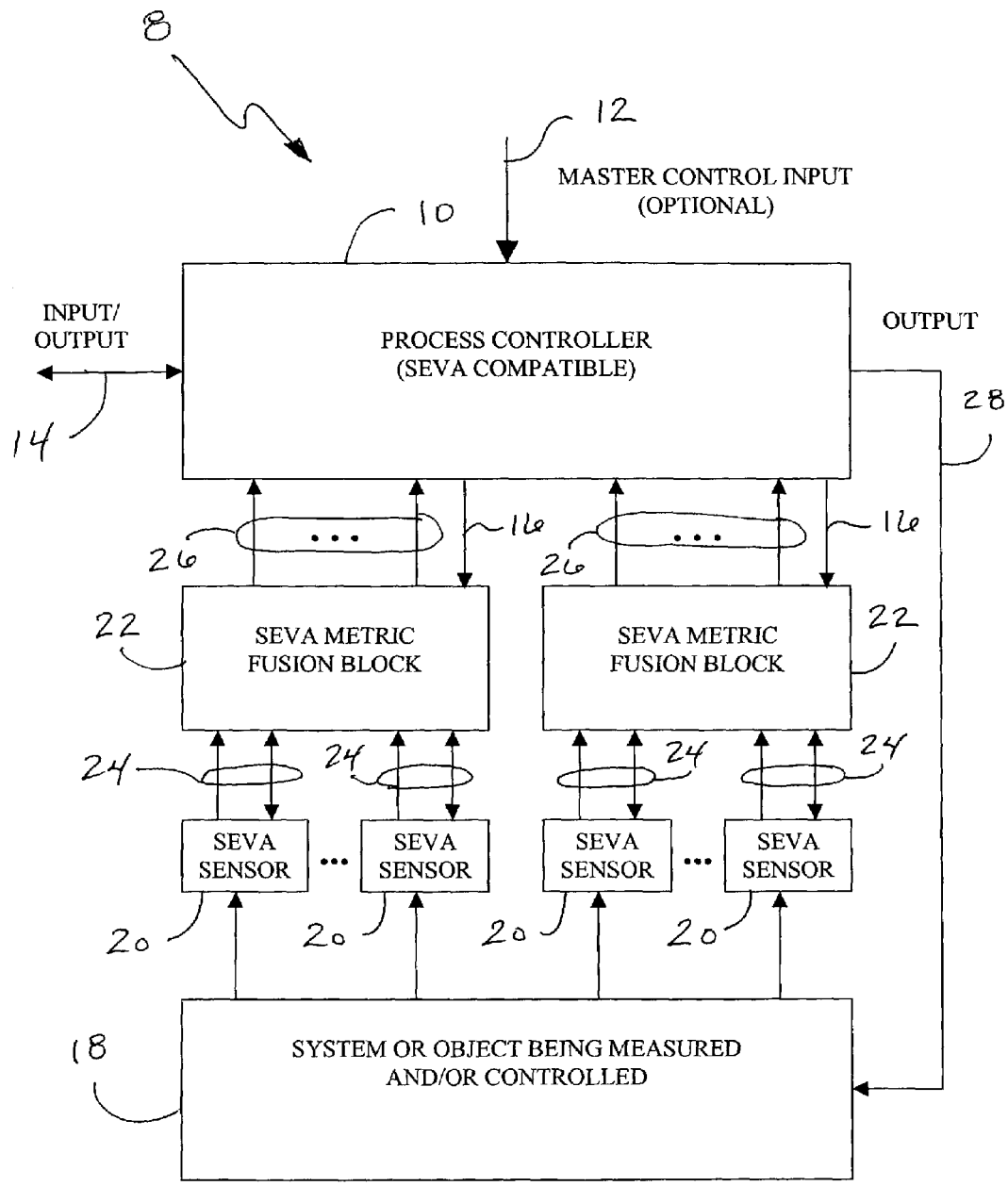
FIG. 1 is a block diagram of a process control system incorporating a measurement fusion system that receives measurement data from one or more process sensors and provides processed measurement data to a process controller.

FIG. 1 shows an exemplary process control system 8 in which a process controller 10 receives input signals, processes the input signals, and provides output signals including feedback signals to other devices within the process control system 8. More specifically, the process controller 10 receives processed measurement data from one or more measurement fusion blocks 22, and also may receive control information on a master control input 12 from an external source. The control information received on the master control input 12 may include control parameters from a central control center, such as that commonly associated with a material processing facility. The process controller 10 optionally may be configured to communicate bi-directionally with other control systems (not specifically shown) by way of an I/O communication channel 14. The process controller 10 also may include one or more output control channels 16 configured to provide control signals to other system modules (e.g., the measurement fusion blocks 22), and includes one or more channels 28 configured to provide control signals to the object or process 18 under control. The control signals may include actuator control signals to operate valves or other devices within the process control system 8. Each output control channel 16, and each feedback channel 28 may be a serial communication channel or a parallel communication channel.

As with many process control systems, a measurand associated with the system or object 18 being monitored and/or controlled may be independently measured by one or more intelligent process sensors 20. As shown, the process sensors 20 are self validating (SEVA™) sensors that generate SEVA™ process measurement data or SEVA™ process metrics. The SEVA™ process metrics are device-independent and application-independent descriptions of a measurement and its quality, and include measurement data (i.e., VMV), uncertainty data (i.e., VU), and measurement value status (i.e., MV status) variables relating to the status of the measurement data.

With continued reference to FIG. 1, each SEVA™ sensor 20 is connected to and communicates with a measurement fusion block such as a SEVA™ metric fusion block 22. The fusion block 22 processes the measurement data (VMV), uncertainty data (VU), and measurement value status data (MV status) received from each SEVA™ sensor 20. Bi-directional communication lines 24 connect each SEVA™ sensor 20 with its associated fusion block 22. The fusion block 22 also is configured to receive input from the process controller 10 through control channels 16, and to provide output and/or feedback in the form of combined SEVA™ process metrics to the controller 10 by way of output channels 26. The communication lines 24 and output channels 26 may be implemented using a variety of analog and digital communication techniques including analog hard wired or process loop communication lines designed for the particular application, or a standard digital process control communication protocol, such as Fieldbus or the FoxCom communication protocol, which is a digital bi-directional communications protocol used for communications among devices in field instrumentation and control systems, and available from Invensys Systems, Inc.

A variety of means, entailing either analog or digital channels, for communicating one or more process parameters between field components and/or software modules in measurement systems and process control systems currently exist. Such protocols may include, for example, 4–20 mA, frequency pulses, binary status flags or any of a number of digital fieldbus communication techniques. It is assumed that appropriate technology is used to provide the inter-modular communication described herein.

Figure 2:
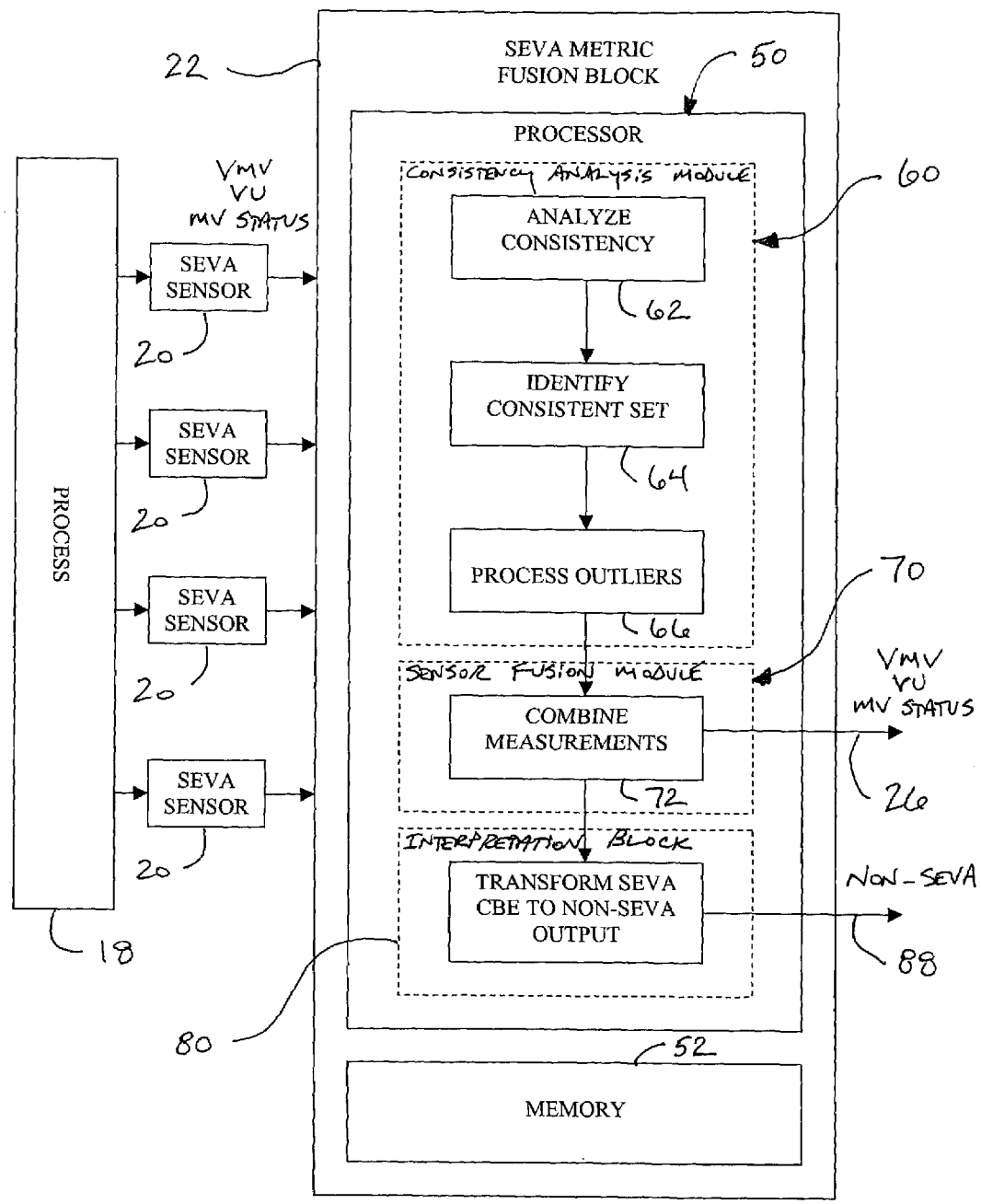
FIG. 2 is a block diagram of another implementation of the process control system of FIG. 1 showing the components of the measurement fusion system.

FIG. 2 shows a block diagram of one measurement fusion block 22 and its processing components that implement the sensor fusion process. Each process sensor 20 is connected to the process 18 to be measured and is responsible for measuring a process parameter associated with the process 18. In some cases, the multiple sensors will be used for monitoring the same process, and the same process parameter, with the resulting measurements being combined. In other cases, separate processes are monitored and the resulting measurements are combined. Each process sensor 20 typically includes a transmitter that provides an independent set of SEVA™ process metrics to the measurement fusion block 22. These SEVA™ process metrics include $VMV_x$, $VU_x$, and MV $STATUS_x$. Each set of process metrics may be produced by an independent process sensor 20, as shown. Alternatively, all calculations can take place within a fusion block 22 residing in a single transmitter (not specifically shown) that receives measurement signals from multiple independent transducers connected to the process 18. The methods for generating the combined best estimate (CBE) in either case are largely identical.

Each fusion block 22 includes a processor 50 and supporting hardware, such as a memory 52 operable to execute multiple processes for interpreting SEVA™ and non-SEVA™ measurement data in order to improve the overall control of a particular measurement and/or process control application. The processes may be implemented via software routines, computer hardware, or a combination thereof. In this exemplary implementation, four process sensors 20 are connected to the fusion block 22 and generate measurement data by monitoring the same measurand (e.g., temperature) associated with the process 18.

The fusion block 22 is designed to receive measurement data and/or process metrics from multiple process sensors 20, where each process sensor 20 is monitoring the same process variable. However, the fusion block 22 also may receive and process SEVA™ measurement data and/or process metrics from only one process sensor 20. The SEVA™ metrics from each of the process sensors 20 are further processed and combined to produce a combined best estimate (CBE) of the metrics (e.g., VMV, VU, and MV status). While the fusion block 22 is described in the context of receiving and processing SEVA™ measurement data from SEVA™ process sensors 20, it should be understood that fusion block 22 also is operable to receive non-SEVA™ measurement data from non-SEVA™ process sensors. Moreover, the analysis process executed within the fusion block 22 is capable of processing and combining both SEVA™ and non-SEVA™ measurement data generated from a variety of process sensors 20.

As will be described in greater detail, each fusion block 22 executes a consistency analysis process to determine the consistency between the redundant SEVA™ measurements, optionally identify a consistent set of measurements, process measurements determined to be outliers, and perform uncertainty augmentation. Each fusion block 22 also executes a fusion process to combine or fuse some or all of the SEVA™ measurements to generate the combined best estimate of the process variable from the independent measurements received from the SEVA™ process sensors 20. In one implementation, only measurements that are determined to be consistent with each other are combined to produce the combined best estimate of the process variable. In an implementation described in greater detail below, measurements determined to be inconsistent are modified by further processing steps and then combined or fused with the set of consistent measurements.

The fusion block 22 executes one type of consistency analysis process when analyzing measurement and uncertainty data from two process sensors 20. The fusion block 22 executes a different, but related, consistency analysis process when analyzing measurement and uncertainty data from three or more process sensors 20. The fusion block 22 may execute yet another measurement data analysis process when only one process sensor 20 is connected to the fusion block 22. In such an exemplary implementation using one process sensor 20, the analysis process executed by the fusion block 22 tracks over time a series of SEVA™ metrics from the single process sensor 20, and makes decisions or detects the presence of a fault based upon changes in the measurement quality from that process sensor 20.

The processor 50 within the fusion block 22 includes a consistency analysis module 60 that executes a consistency analysis process 62. The consistency analysis process 62 analyzes the set of independent measurements and process metrics from the process sensors 20 connected to the fusion block 22. In practice, the independent measurements received from the process sensors 20 are not necessarily consistent with each other. The consistency analysis process 62 determines whether any of the process metrics is inconsistent with the other process metrics, and process 64 identifies the consistent set of process metrics. The consistency analysis module 60 also executes an outlier handling process 66. The process steps executed within the consistency analysis module 60 are described in greater detail below.

The processor 50 within the fusion block 22 also includes a sensor fusion module 70 that executes a sensor fusion process 72. The sensor fusion process analyzes and combines the independent measurements or process metrics from the consistency analysis module 60 to generate the combined best estimate. In one implementation, the sensor fusion process 72 analyzes the set of measurements and metrics from the multiple independent process sensors 20 that are measuring the same process variable. The sensor fusion process 72 executes a process to combine any number of consistent measurements and their associated uncertainties to produce a combined best estimate of the true value of the process variable. The sensor fusion process 72 takes into account several factors, including the model of the measurand to be tracked, the model of the measurement uncertainty, the technique for assessing consistency of the measurements (used by the consistency analysis process 62), the technique for handling inconsistent measurements (used by the outlier handling process 66), and the technique for combining the consistent measurements, to provide a combined best estimate of the measurements.

To better understand the sensor fusion process 72, consider the case of n SEVA™ process sensor measurements $x_i$, where i=1, . . . , n, with their associated uncertainties $u_i$, all estimating the same single valued measurand or process variable. After the outlier handling process 66 handles and further processes measurement values considered to be outliers, the sensor fusion process 72 determines and generates the combined best estimate (CBE) of the measurand and its uncertainty using the following process. Given n SEVA™ measurements $x_1$ with their associated uncertainties $u_i$, and assuming the measurements are consistent and independently derived, the combined best estimate (CBE) $x^*$ and its uncertainty $u^*$ are given by:

$$x^* = \sum_{i=1}^{n} w_i x_i \text{ where } w_i = \frac{\left(\frac{1}{u_i}\right)^2}{\sum_{j=1}^{n}\left(\frac{1}{u_j}\right)^2}$$

$$u^* = \sqrt{\sum_{i=1}^{n} w_i^2 u_i^2} = \frac{1}{\sqrt{\sum_{i=1}^{n}\left(\frac{1}{u_i}\right)^2}}$$

It should be noted that the combination operation is associative. The sensor fusion process 72 also determines the MV status for the combined measurement, based upon the consistency of the input measurements as well as their individual MV status values. Thus, the output of the fusion block 22 is a single SEVA™ process metric or measurement (CBE) that represents the "best estimate" of the combined measurements including the VMV, VU, and MV status associated with the combined measurement. The sensor fusion process 72 also may generate a consistency flag if multiple measurements are found to be inconsistent with each other. The CBE and in some cases the consistency flag are then provided to the process controller 10 on one or more of the output channels 26.

1. Consistency Checking

As described above, the consistency analysis module 60 executes a consistency analysis process 62 to determine which of the independent process metrics within the set of independent process metrics are consistent with each other. Various causes of inconsistencies include random fluctuations in fault-free process sensors, an undetected fault condition, and/or the received measurement reflecting an available value rather than the ideal or true value.

A. Consistent vs. Inconsistent Measurements

Consistent measurements agree with each other, as indicated by a criterion described in greater detail below. Inconsistencies may arise for any of the following three reasons.

First, even when all of the redundant measurements are individually representative of the measurand, random fluctuations may result in mutual inconsistencies occurring from sample to sample. The other reasons for inconsistencies are more serious, in that they entail a misrepresentation of the measurand by one or more measurements.

Second, each measurement is generated by a process sensor 20, which should provide detailed and device-specific fault detection. It might reasonably be assumed that a commercial process sensor should be able to detect between 90% and 99.9% of all occurrences of faults within itself, allowing for faults which are inherently difficult to detect, and commercial design limitations due to cost/benefit trade-offs. Thus, there exists the possibility that a process sensor may fail to detect a fault within itself, and as a result may generate an unrepresentative or incorrect measurement. In a process sensor having a single transmitter receiving raw data from multiple transducers, consistency checking may be the primary form of validating the raw data, as internal inconsistencies may arise more frequently.

Third, a process sensor is only able to measure the available value of a process variable, rather than the ideal or true value of the process variable. For example, the average temperature within a pressure vessel may be the process variable (also referred to as a measurand) of interest, but in practice only localized temperatures near the vessel wall are available. A better estimate of the average temperature may be obtained by combining two temperature measurements. Irrespective of any process sensor faults, it is possible for the two measurements to become inconsistent if, for example, a significant temperature gradient develops across the vessel. This phenomenon is referred to as available measurement drift.

The fundamental principle of consistency checking is to identify incorrect measurements. As part of this identification process, it is assumed that incorrect measurements are relatively rare, and that correct measurements are likely to be consistent with each other.

It follows that if one measurement within a set of independent measurements is inconsistent with the rest, it is likely that the one inconsistent measurement is incorrect, since the alternative (that the one measurement is correct and all the other measurements are incorrect) is much less probable. Generalizing, the principle of majority voting is derived such that if a majority of measurements are consistent, they are assumed to be correct, and any minority of measurements inconsistent with the majority are judged to be incorrect. If there is no majority consensus, then alternative calculations are performed. Thus, the guiding principle is that inconsistency implies incorrectness.

B. Consistency Checking for Two Measurements

Given two independent measurements x and associated uncertainties u, $(x_1, u_1)$ and $(x_2, u_2)$, the Moffat criterion states that the measurements are consistent (with 95% probability) if:

$$\left| \frac{x_1 - x_2}{\sqrt{u_1^2 + u_2^2}} \right| < 1$$

The Moffat consistency criterion ensures that the combined best estimate (CBE) of two measurements falls within the uncertainty of each. Additional details of the Moffat consistency criterion are described in R. J. Moffat, "Contributions to the Theory of Single Sample Uncertainty Analysis," ASME Journal of Fluid Engineering, vol. 104, pp. 250–260, 1982, which is incorporated herein by reference.

The detection of inconsistencies between redundant measurements is an established field of study. As part of the consistency analysis process 62, the measurements are treated as time series of point values. Generally, no consideration is given to the uncertainty interval surrounding each measurement, as the magnitude of the uncertainty is not usually available.

According to known techniques of analytical redundancy, given a set of redundant measurements, one or more residual functions are created, each of which is designed to remain "close" to zero as long as the measurements are consistent. When a fault occurs, a variety of techniques may be applied to determine which sensor (or other system component) is responsible for the inconsistency. Normally, such techniques entail modeling of system dynamic behavior and/or sensor fault modes, which can be difficult and/or expensive. Choices also can be made about each decision-making threshold, i.e. the value which, if exceeded by a residual function, indicates a significant inconsistency. The availability of the uncertainty of each measurement provides a richer set of information with which to work.

Moffat provides a method of testing consistency between two measurements $x_1$ and $x_2$, given their uncertainties $u_1$ and $u_2$. Under the hypothesis that the measurements are correct, i.e. that they are representative of the same measurand, then the function $$\phi = x_1 - x_2 \text{ with uncertainty } u_\phi = \sqrt{u_1^2 + u_2^2}$$

should be close to zero. In other words, it is expected that $$d_{12}^m = \frac{x_1 - x_2}{\sqrt{u_1^2 + u_2^2}}$$

where $d^M_{12}$ is Moffat distance, satisfies the following criterion (herein the Moffat criterion):

$$|d_{12}{}^m| < 1$$

at the usual (i.e. 95%) probability. The Moffat consistency test thus can be seen as a simple static form of residual function. This definition of consistency is somewhat counter-intuitive, in that uncertainty intervals may overlap and yet still be declared inconsistent, as illustrated in the following example.

Figure 3:
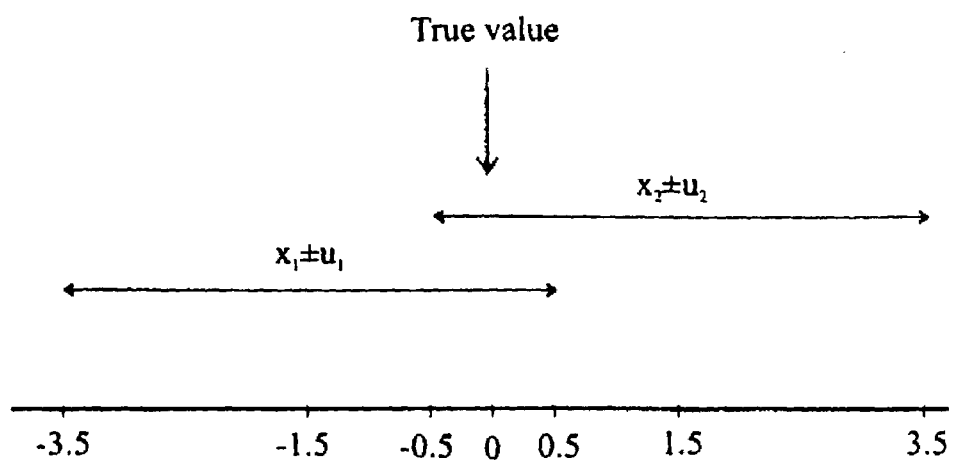
FIG. 3 is a graph showing exemplary overlapping intervals of process sensor measurements that are not Moffat consistent.

FIG. 3 illustrates an example of overlapping intervals that are not Moffat consistent. For example, suppose that the true measurand is 0, and that the two process sensors generate measurements $x_1$ and $x_2$ with a distribution $\mathcal{N}(0, 1)$, it then follows that $u_1=u_2=1.96$. If at a particular instant, $x_1=-1.5$ and $x_2=+1.5$, it can be seen that the uncertainty intervals overlap the true value and each other, and yet the consistency test fails, for $\phi=-3$ and $u_\phi=\sqrt{2}*1.96=2.77$. In other words, both measurements are correct, and yet they are not consistent. This is due to the probabilistic nature of the test. It should be noted here that the chance of a Type I error is 5%. As the distributions are normal, this can be confirmed analytically: $x_1$ and $x_2$ are $\mathcal{N}(0, 1)$, so $\phi=x_1-x_2$ has distribution $\mathcal{N}(0, 2)$. Thus there is a 5% probability that a random sample from this distribution will fall outside the uncertainty interval $u_\phi=\sqrt{2}*1.96=2.77$.

The degree of overlap required for Moffat consistency is a maximum when $u_1=u_2$. Suppose $u_1$ is kept constant and $u_2$ is increased, then the degree of overlap required for consistency, as a proportion of $u_1$, decreases asymptotically to zero. Thus, Moffat consistency ensures that the combined best estimate (CBE) of the two measurements falls within the uncertainty intervals of each. A logical corollary is that there must be an overlap between the two uncertainty intervals and that the CBE falls within the overlap. Additionally, if $x_1$ and $x_2$ are Moffat consistent, then the CBE (with its reduced uncertainty) is also Moffat consistent with $x_1$ and $x_2$.

The Type I threshold of 5% is presumably acceptable for the analysis of experimental data. However, for the purposes of on-line monitoring of redundant measurements in an industrial process control context, this probability is too high, and may lead to a steady stream of trivial alarms. The alarm frequency may be reduced by modifying the test to use the test criterion $ku_\phi<=\phi<=ku_\phi$ to demonstrate consistency, where k is a fixed but arbitrary value which controls the probability of a Type I error. The value $k=\sqrt{2}$ has intuitive appeal, as it would result in two uncertainty intervals of equal magnitude being declared consistent if there is any overlap between them, and has a reduced Type I error of about 0.25%. However, if, for example, $u_2$ increases relative to $u_1$, the counter-intuitive result is derived that two intervals are consistent even if they do not overlap at all, and even if there is a large gap between them. For example, using $k=\sqrt{2}$, all of the following uncertainty intervals pairs are consistent, even where the uncertainty intervals do not overlap:

(1) 0±1 and 1.99±1;
(2) 0±1 and 14±10; and
(3) 0±1 and 140±100

From this, it may be concluded that k=1 is the only acceptable value. There remains the concern that the 5% probability of a Type I error is too high.

A further approach may be simply to define two measurements as consistent if their uncertainty intervals overlap. This approach may be termed overlapping consistency.

2. Determining Consistency of Three or More Measurements

One of the difficulties associated with checking the consistency of three or more process metrics is that neither the Moffat consistency criterion, nor overlapping consistency is transitive. One solution is to find the maximum subset of mutually consistent measurements, which may be referred to as the consistent set. This technique is equivalent to the maximum clique problem from graph theory. Once the maximum subset of mutually consistent measurements is found, the measurements outside the consistent set, or outliers, are handled.

Figure 4:
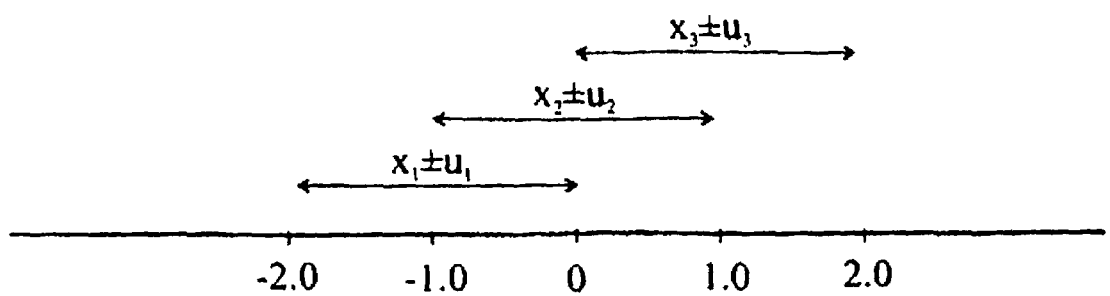
FIG. 4 is a graph of three process sensor measurements showing that the consistency properties of the measurements are not transitive.

For the principle of majority voting to be applicable, the consistency analysis module 60 needs to have three or more measurements. When two measurements are found to be inconsistent with each other majority voting cannot resolve the conflict. However, for more than two measurements, both Moffat's definition of consistency and overlapping consistency introduce a problem, in that the consistency criterion is not transitive. For example, FIG. 4 illustrates that −1±1 is consistent with 0±1, and that 0±1 is consistent with 1±1. However, −1±1 is not consistent with 1±1.

Furthermore, it has been shown that there is a 5% probability that any two correct measurements of the same measurand are not consistent. Thus, given a set of three or more independent measurements that need to be combined, two issues should be considered. First, the maximum subset of mutually consistent measurements must be found and declared the consistent subset. Second, the measurements outside this subset, termed outliers, must be dealt with bearing in mind that inconsistency also may be due to probabilistic jitter rather than process sensor error.

A. Consistency Checking

Figure 5:
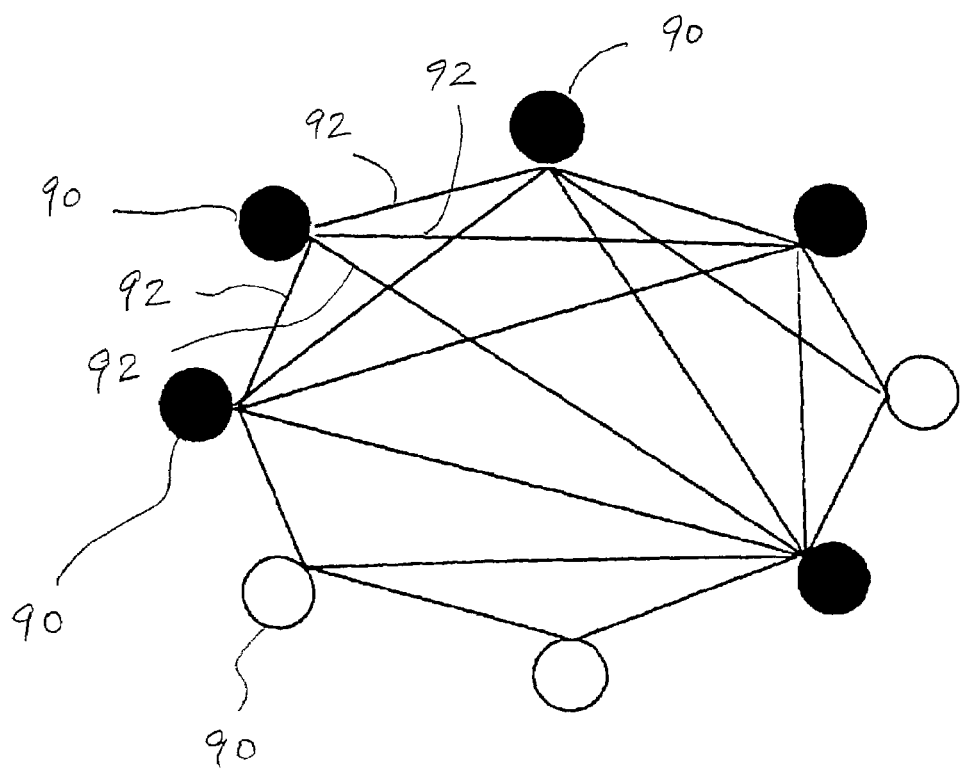
FIG. 5 is a diagram illustrating a maximum clique technique for finding a maximum subset of mutually consistent measurements from a set of process sensor measurements.

With reference to FIG. 5, it can be shown that the problem of finding the maximum subset of mutually consistent measurements is equivalent to the maximum clique problem in graph theory. That is, given a set of nodes 90 and arcs 92, find the maximum subset of nodes (also called a clique) with the property that each node 90 from the subset is connected to every other node from the subset. If each node 90 is a measurement and each arc 92 is a consistency relation, then this is equivalent to the problem of measurement consistency checking.

An exhaustive search is required to solve the maximum clique problem. Consider a set of n SEVA™ measurements $x_i$ with uncertainties $u_i$, i=1, 2, . . . , n. A prerequisite for the search is the building of the measurement graph. The n nodes are the values $x_i$, while the existence of an arc between $x_i$ and $x_j$ is determined by whether they are consistent, i.e. whether $x_i$ is consistent with $x_j$. Let p be the maximum clique order. The search process starts by trying p=n (i.e. all measurements are consistent) and systematically works down until a clique is found or until p=1. When a clique is found, the process continues to further search for any other cliques of the same order.

FIG. 6 shows exemplary pseudo-code for implementing the steps of the exhaustive search process, and may be performed in one implementation of the consistency analysis process 62 executed by the consistency analysis module 60. The first step in the process is the initialization step in which the Moffat distance is computed for each measurement in the set of measurements. Next, the process builds a measurement graph. The second step in the process involves a search for the maximum cliques within the measurement graph. The search starts by determining whether all of the measurements are consistent with each other. Next, a process is repeated to build a tree of all possible combinations of n nodes (representing n SEVA™ measurements) taken in sets of p (the maximum clique order). The search continues by searching the entire tree and recording all of the cliques found during the search. The maximum clique order p is reduced by 1, and the exhaustive search process continues until p=1.

B. Approximation of The Maximum Clique By Linear Search

The exhaustive search for the maximum cliques can become processing intensive as the number of measurements increases and the order of the maximum clique decreases. To overcome the challenges associated with the exhaustive search, an alternate search process for approximating the maximum clique may be used. This process for approximating the maximum clique uses overlapping intervals instead of the Moffat criterion to check for consistency. Because this method is linear in the number of measurements, it has far less complexity than the exhaustive search. Moffat consistency is ensured within the resulting cliques by a latter processing stage called uncertainty augmentation, which is described in greater detail below. This technique is also applicable where overlapping is used as a consistency criteria.

Consider again the set of n SEVA™ measurements $x_i$ with uncertainties $u_i$, i=1, 2, ..., n, and let the uncertainty interval for the ith measurement, i=1, 2, ..., n, be $(l_i, h_i)$, where $l_i = x_i - u_i$ and $h_i = x_i + u_i$ are the lower and upper bound, respectively. The set of n measurements then can be described by an ordered bound list containing all $l_i$ and $h_i$. Without loss of generality, the $x_i$ can be assumed ordered so that $l_1 < l_2 < \ldots < l_n$. The $h_i$ may occur in any order interleaved through the $l_i$, subject only to the constraint that $h_i > l_i$ (and hence $h_i > l_k$, k=1 ... i). The overlapping intervals are readily identified by stepping through the ordered list of bounds. The approximation of the maximum clique(s) is given by the measurements having uncertainty intervals defining the area(s) of maximum overlap.

Figure 7:
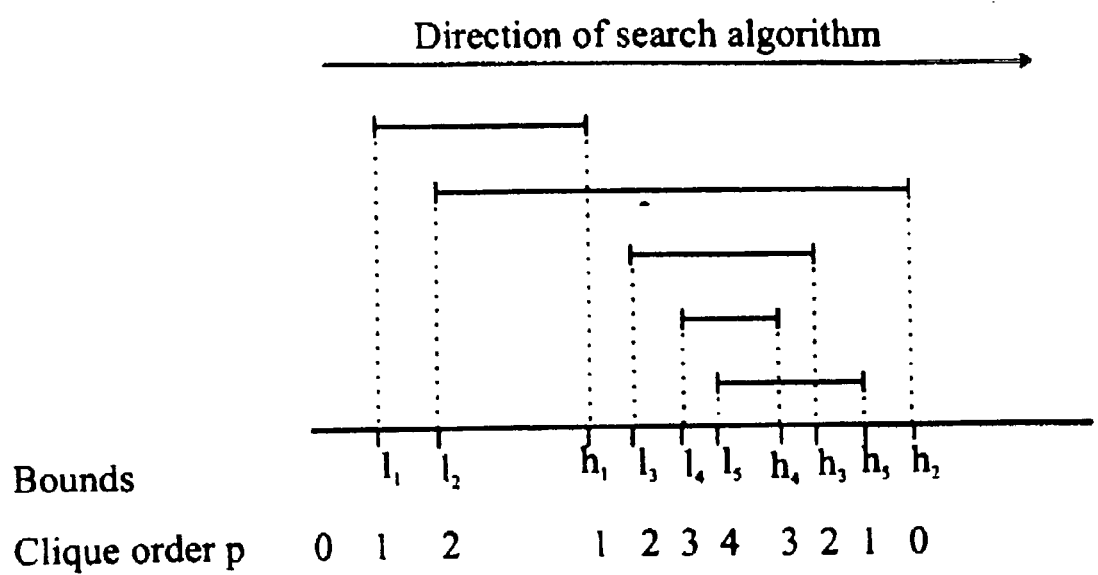
FIG. 7 is a graph showing process sensor measurements having overlapping intervals and illustrates a linear search process for approximating the maximum clique.

FIG. 7 is a graph illustrating the method. The bound list is in this case given by $l_1 l_2 h_1 l_3 l_4 l_5 h_4 h_3 h_5 h_2$. The point of maximum overlap involves measurements 2, 3, 4 and 5, which are therefore considered as an approximation of the maximum clique.

The steps for approximating of the maximum clique(s) by a linear search process are summarized in FIG. 8, and may be performed in another implementation of the consistency analysis process 62 executed by the consistency analysis module 60. The process walks through the bound list in increasing order. When a lower boundary is encountered, the corresponding measurement is added to the set of active measurements, whose order p is thus incremented. When an upper bound is encountered, the corresponding measurement is removed from the set of active measurements whose order is thus decremented. At each stage, if the order of the active measurement set exceeds all previous values, then the active set becomes the new maximum clique. If its order equals that of the current maximum clique then the set is stored as an additional maximum clique.

C. Processing Outliers

Referring back to FIG. 2, an outlier processing module 66 executes an outlier handling process according to the following technique. An inconsistent measurement can be made consistent by a sufficient increase in its uncertainty. This is also referred to as uncertainty augmentation. The technique is performed by making those peripheral measurements for which the required increase is not too large consistent with the core measurement, and discarding the remaining peripheral measurements (for which the increase is too large) as true outliers.

Having found or approximated a maximum clique, an apparent next step would be to use the maximum clique to calculate the CBE using the following equations, and to ignore all outliers.

$$x^* = \sum_{i=1}^{n} w_i x_i \text{ where } w_i = \frac{\left(\frac{1}{u_i}\right)^2}{\sum_{j=1}^{n}\left(\frac{1}{u_j}\right)^2}$$

$$u^* = \sqrt{\sum_{i=1}^{n} w_i^2 u_i^2} = \frac{1}{\sqrt{\sum_{i=1}^{n}\left(\frac{1}{u_i}\right)^2}}$$

However, such an approach has a number of difficulties. First, given the probabilistic nature of the uncertainty, even if all measurements are correct representations of the measurand, there is only a 95% chance of each pair being consistent. As the number of inputs increases, the probability of all measurements being consistent diminishes. For example, with ten normally distributed measurements of equal variance and mean, there is only an 85% chance of all ten measurements being consistent at any given time.

Second, if on average, one measurement is only marginally consistent with the rest, then, sample by sample, the measurement may regularly switch between being judged consistent and inconsistent. This will generate undesirable jitter on the CBE.

Third, it is possible that at any given time there may be more than one maximum clique. For example, with three measurements $x_1$, $x_2$ and $x_3$, such that $x_1$ is consistent with $x_2$ and $x_2$ is consistent with $x_3$, while $x_1$ is not consistent with $x_3$, then there are two maximum cliques, $(x_1, x_2)$ and $(x_2, x_3)$. As a result, it is not readily apparent which of the maximum cliques to use for calculating the CBE.

The following strategy can be implemented as part of the outlier handling process to resolve these issues. The underlying idea is that any inconsistent measurement can be made consistent by a sufficient increase in the measurement's own uncertainty, and that such an increase will cause a reduction in the weight of that measurement in the CBE. This approach is not based on uncertainty theory, but rather is a heuristic approach which has the desirable characteristics of smoothing over probabilistic inconsistency jitter, and providing a smooth reduction of weighting for inconsistent measurements.

In the most general case, when there is more that one clique, the measurements are partitioned into two sets:

1. The core set, which is the intersection of all the maximum cliques; and
2. The peripheral set, which is the rest of the measurements (i.e. those being either in at least one of the maximum cliques, but not in the core set, or those outside any maximum clique).

If the maximum cliques were found using the exhaustive search process, then the mutual Moffat consistency of the measurements inside each clique are ensured. However, this is not guaranteed to be the case with the linear search process. Thus, for the core and peripheral sets resulting from the linear search process, additional consistency checking should be done before the CBE is computed.

The first step is to compute a maximum Moffat distance $d^M_{max}$ between pairs of measurements from the core set. If the maximum Moffat distance is greater than one, then at least one of the measurements pairs is inconsistent. The uncertainties $u_i$ of all measurements from the core set then are increased to $u'_i = d^M_{max} u_i$, which are values that will ensure mutual consistency.

Each measurement from the peripheral set then is considered in turn, and the maximum Moffat distance to the measurements in the core set is found. If this distance is greater than a specified threshold (e.g., 3), then the measurement is judged to be a true outlier and is ignored. If, however, this distance is less than the specified threshold, then the uncertainty interval for the measurement is augmented as described to make the measurement consistent with the measurements in the core set. The measurements from the peripheral set thus processed are then merged with those in the core set to obtain the CBE. This process of uncertainty augmentation reduces, but does not eliminate, the influence of the involved measurements on the CBE. In particular, if a measurement slowly drifts into inconsistency with the rest, uncertainty augmentation ensures a smooth reduction of influence on the CBE before the measurement is finally labeled as an outlier.

One circumstance not covered by the above process is where there are multiple maximum cliques with no intersection between them. Upon detection of this situation, a "middle clique" is found as being the maximum clique closest to the mean of the merged values for each maximum clique. The middle clique then is considered to be the core set while the peripheral set contains the remaining measurements.

D. Operation of Measurement Fusion Block

With reference again to FIG. 2, given a set of n SEVA™ measurements ($x_i$, $u_i$, $status_i$) that have been processed for consistency and outliers, the sensor fusion module 70 executes the following process. First, the sensor fusion process 72 calculates the CBE and its uncertainty using the process described above. Normally, the VMV output by the sensor fusion process 72 is set equal to the CBE, and the VU is set equal to its uncertainty.

Next, the sensor fusion module 70 assigns the MV status to the combined measurement data set. As a configuration option, the user can assign the minimum acceptable size of the maximum clique (for example 2 out of 3 or 6 out of 10). If this minimum acceptable size of the maximum clique is not reached (during the consistency analysis process 62 executed by the consistency analysis module 60), then the CBE is not used by the sensor fusion process 72 to generate the VMV. Instead the sensor fusion process 72 projects the VMV and VU from past history of measurements stored in the memory 52 associated with the processor 50. Additionally, the sensor fusion process 72 sets the MV status to DAZZLED or, if the condition persists, the sensor fusion process 72 sets the MV status is set to BLIND.

If the minimum acceptable size of clique is reached, then the sensor fusion process 72 sets the MV status to SECURE COMMON if the process sensors 20 are of identical type; otherwise sets the MV status to SECURE DIVERSE if the process sensors 20 are of different types. Thus, the user has a further configuration option. This is the minimum number of CLEAR (or better) consistent measurements required to declare the CBE to be SECURE. If this target is not met, then the CBE is assigned the best MV status of the consistent measurements (i.e., CLEAR, BLURRED, DAZZLED or BLIND).

Each SEVA™ measurement is then also assigned a consistency flag by the consistency analysis module 60. The consistency flag takes the value 1 if the measurement was found to be in the core or was made consistent with the core by uncertainty augmentation, and 0 otherwise. This flag may be used (possibly after further filtering to avoid jitter) to trigger additional diagnostic testing within any process sensors 20 whose measurements were found inconsistent with the majority.

E. Exhaustive Search vs. Linear Search Approximation

Simulations have been carried out to compare the performance of the two methods for finding the set of mutually consistent SEVA™ measurements, namely, the exhaustive search for the maximum clique, and the approximation of the maximum clique by linear search. In these first simulations, fault-free behavior is considered. It is desirable to have a match between theoretical and simulation results for the following statistics:

mean of the CBE;

variance in mean of the CBE;

reported uncertainty of the CBE.

In addition, it is desirable for the reported uncertainty to be reasonably constant, and for the incidence of reported inconsistencies to be low (as there are no true faults, just random variations).

F. Illustrative Example 100,000 random sets of 3, 6 and 10 SEVA™ measurements were generated as follows:

the true measurand value is 0;

the measurements were randomly generated from a normal distribution with a mean of zero and unit variance. This corresponds to an uncertainty of 1.96.

100,000 random sets of 2 to 10 measurements were generated as above, and the percentage of sets found to fail being fully consistent (according to the Moffat criterion) are given in Table I.

TABLE I

| No. of meas. | 2 | 3 | 4 | 5 | 6 | 7 | 8 | 9 | 10 |
|---|---|---|---|---|---|---|---|---|---|
| Mean (%) | 5.01 | 12.26 | 20.33 | 28.47 | 36.53 | 44.08 | 50.89 | 57.16 | 62.72 |
| Std. Dev. (%) | 0.21 | 0.38 | 0.36 | 0.39 | 0.47 | 0.58 | 0.56 | 0.43 | 0.57 |

Table I represents the percentage of measurement sets found to be not fully consistent according to the Moffat criterion.

The theoretical value of the standard deviation of the CBE is then $$\frac{1}{\sqrt{n}}.$$

This gives an uncertainty of 1.96.

$$\frac{1}{\sqrt{n}}.$$

The means and standard deviations of the reported values of the CBE and its uncertainty has been computed over the 100,000 simulations, and they are contrasted with the corresponding expected values in Table II.

TABLE II

| | Exhaustive Search | Linear Search | Theoretical Value |
|---|---|---|---|
| 3 sensors: | | | |
| Mean of CBE | 0.002 | 0.002 | 0.0 |
| Std of CBE | 0.581 | 0.579 | 0.577 |
| Mean of uncertainty | 1.136 | 1.129 | 1.131 |
| Sets with k < n | 0 | 0 | |
| 6 sensors: | | | |
| Mean of CBE | 0.002 | 0.002 | 0.0 |
| Std of CBE | 0.411 | 0.410 | 0.408 |
| Mean of uncertainty | 0.806 | 0.804 | 0.800 |
| Sets with k < n | 0 | 0 | |
| 10 sensors: | | | |
| Mean of CBE | 0.0 | 0.0 | 0.0 |
| Std of CBE | 0.320 | 0.320 | 0.316 |
| Mean of uncertainty | 0.626 | 0.624 | 0.619 |
| Sets with k < n | 0 | 0 | |

In Table II, k is the number of consistent measurements after uncertainty expansion and n is the total number of measurements in the set.

In this fault-free simulation, all process sensor values were included in the calculation of all the CBEs through the use of the expanded uncertainty weighting technique. By contrast, without this technique, a significant percentage of sets are found to be inconsistent (e.g. in the case of 10 sensors, only 85% of the sets were found fully consistent).

At this point it can be concluded that the exhaustive search for the maximum clique and the approximation of the maximum clique with the linear search give very similar results. Given the simplicity and computational efficiency of the linear search, this process may be desirable, certainly for larger numbers of sensors (for example>5). Also, the results show a reasonable match between the expected value of the CBE uncertainty, its actual variation, and its reported uncertainty.

3. Simulation Results

Experiments have been performed to study the behavior of the fusion process block 22 when one of the SEVA™ sensors signals a fault or gives a incorrect description of the measurand. In view of the results in the previous section, the linear search method was used to generate the following results.

The experiments consisted of simulating the on-line behavior of three SEVA™ sensors. Two of the SEVA™ sensors give a correct description of the measurand (as in the previous section), while the third SEVA™ sensor either signals a fault or generates an incorrect description of the measurand.

In each case, a constant true measurement value of 2 was considered. The simulated faults were as follows:

Example 1: A spike fault—saturation at upper limit occurs at 125 seconds; the fault is permanent. The SEVA™ process sensor detects the fault and first changes the MV status to DAZZLED, and then to BLIND.

Example 2: A drift fault—a faulty ramping value is added to the true measurement with the slope of 0.001 units per second. The fault begins at 125 seconds and is permanent. The SEVA™ process sensor detects the fault and changes the MV status to BLURRED.

Example 3: A drift fault—a faulty ramping value is added to the true measurement with the slope of 0.001 units per second. The fault begins at 125 seconds and is permanent. The SEVA™ process sensor does not detect the fault and reports the measured value along with an MV status value of CLEAR.

For the cases when the third SEVA™ sensor gives an incorrect description of the measurand, this was accomplished by ensuring that the VU was of the usual magnitude and the MV status was CLEAR while the VMV in fact suffers a drift starting at 125 seconds with a slope of 0.001 units per second.

Figure 9A:
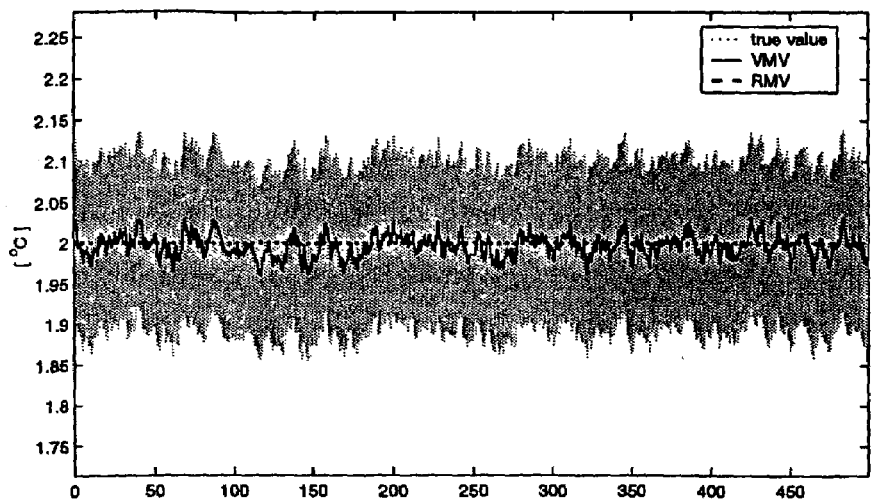
FIGS. 9A–9C are graphs of process metrics from a fault-free SEVA™ process sensor with a constant true value.
Figure 9B:
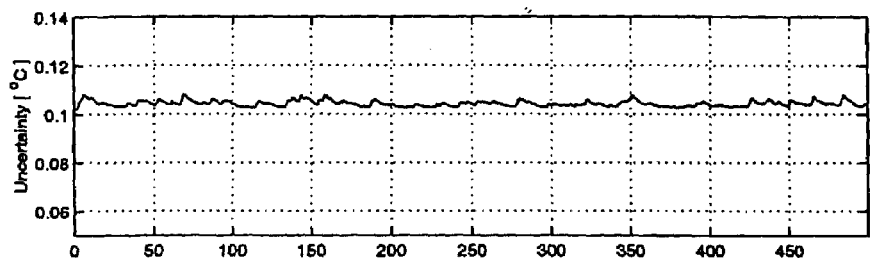
Figure 9C:
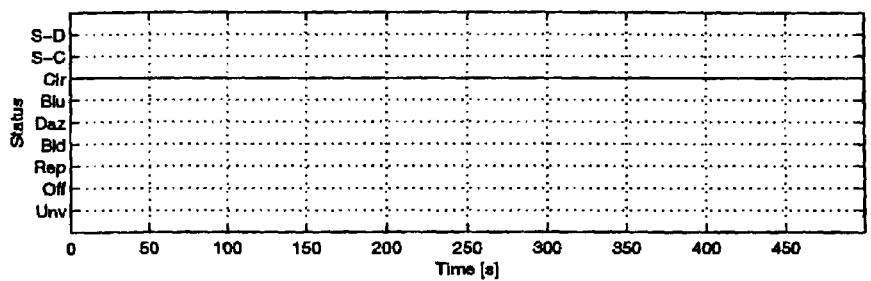
Figure 10D:
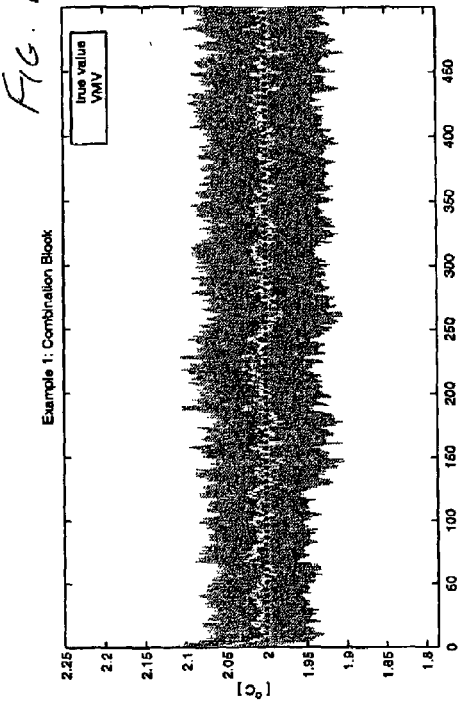
FIGS. 10A–10F are graphs of process metrics from a SEVA™ process sensor exhibiting a permanent saturation fault and a measurement fusion block associated with a first example.
Figure 10E:
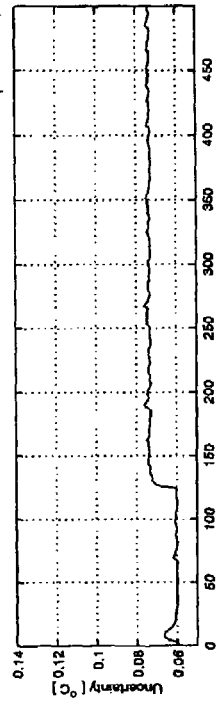
Figure 10F:
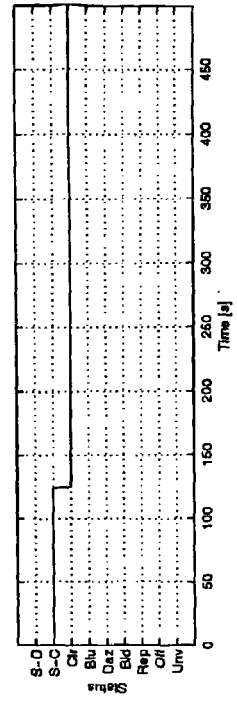
Figure 10A:
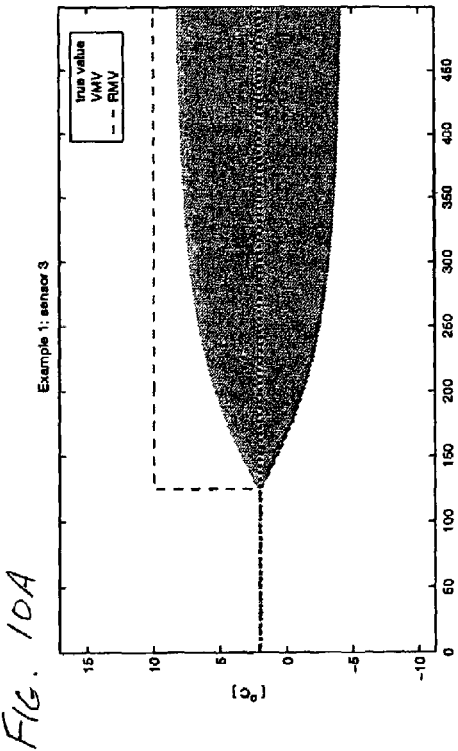
Figure 10B:
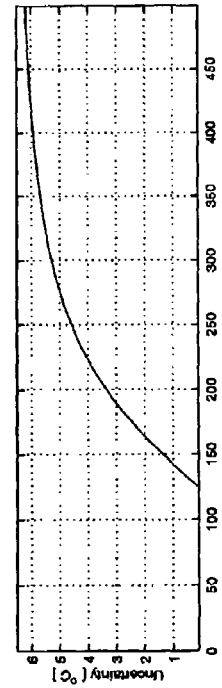
Figure 10C:
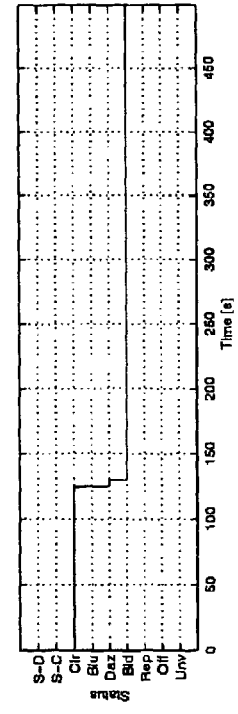
Figure 11D:
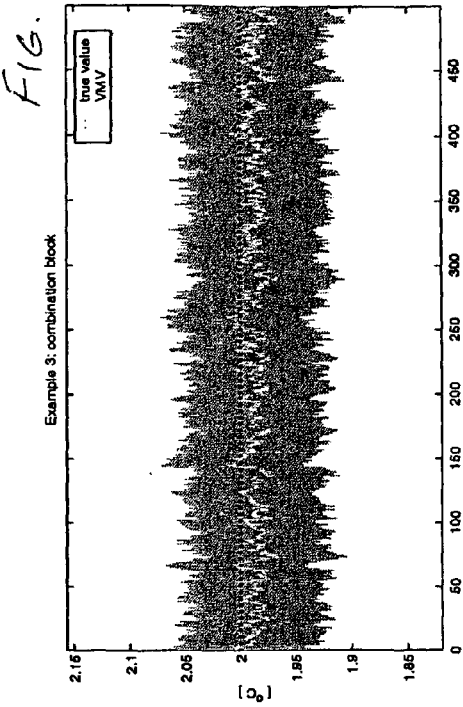
FIGS. 11A–11F are graphs of process metrics from a SEVA™ process sensor exhibiting a drift fault and a measurement fusion block associated with a second example.
Figure 11A:
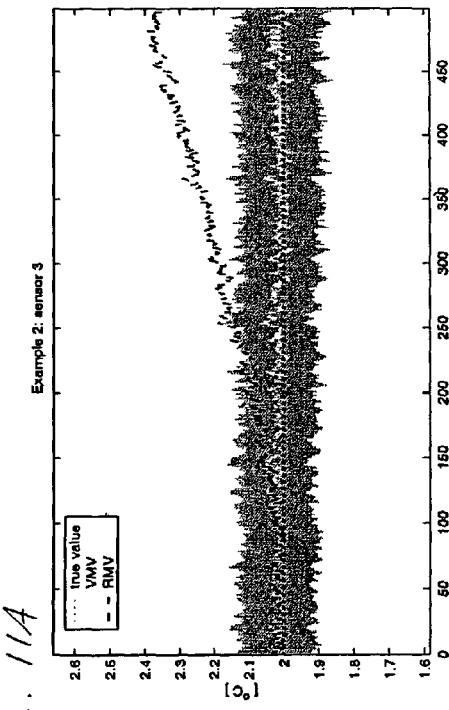
Figure 11E:
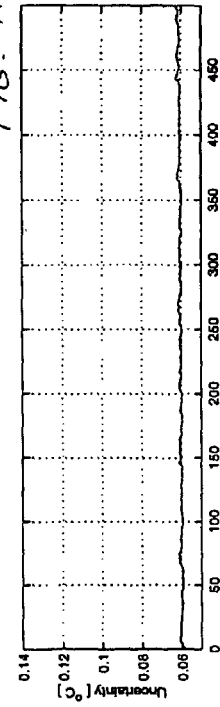
Figure 11B:
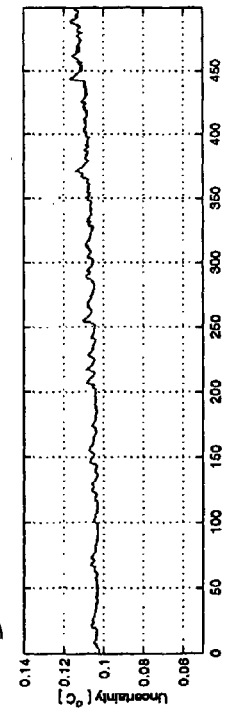
Figure 11F:
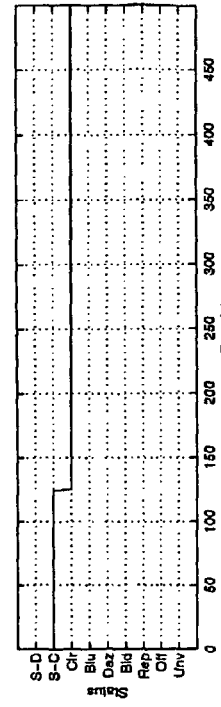
Figure 11C:
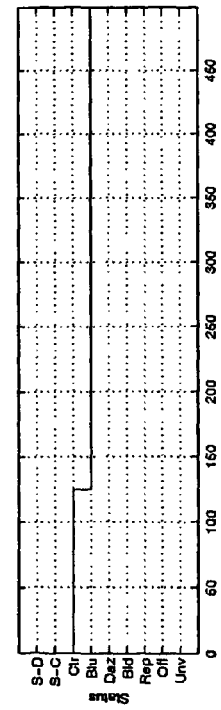

The time series of the VMV, the VU and the MV status for a typical process sensor (as used in this study) exhibiting fault-free behavior and generating a correct description of the measurand is given in FIGS. 9A–9C. Additionally, FIGS. 10A–10F, 11A–11F and 12A–12F show the outputs of the faulty sensor and the fusion block 22 for Examples 1, 2 and 3 respectively.

FIGS. 10A–10F graphically illustrate Example 1 where the third process sensor exhibits a permanent saturation fault. The third process sensor's output is characterized by the usual SEVA™ response. More specifically, the VMV is projected from past history. In this case the VMV remains reasonably accurate as the process is stationary. The MV status changes to DAZZLED and then BLIND when it is deemed that the saturation is permanent. The uncertainty increases at a rate learned from past history using conventional SEVA™ processing techniques.

The response of the fusion block 22 is as follows:

1. The MV status of the fusion block 22 can only remain SECURE COMMON if a configured number of input process sensors are CLEAR. In this case the number is three, so as soon as the third process sensor changes MV status, the output from the fusion block 22 reverts to CLEAR. Note that hysteresis is used to prevent excessive jitter on the MV status generated by the fusion block 22.

2. The measurements are combined according to their consistency and uncertainty weightings. In both cases the measurement from the faulty process sensor remains consistent, but its influence declines rapidly, weighted by the inverse square of its increasing uncertainty. This also results in the rapid increase in the uncertainty of the combined measurement from about 0.06 to 0.075 after the fault.

FIGS. 11A–11F graphically illustrate Example 2 where a drift fault occurs in the third process sensor, but the process sensor detects the fault and attempts to compensate. Thus the raw measurement value (RMV) is seen to drift off quickly, but the SEVA™ sensor reduces the effect of the fault by internal correction (which still leaves some marginal drift). The process sensor then declares the measurement BLURRED and increases its uncertainty. In these cases, the slow increase in the VU of the faulty process sensor is reflected in a very marginal increase in the uncertainty of the fusion block 22. Again, the change in the MV status is also accounted for in the change of MV status generated for output by the fusion block 22.

In Examples 1 and 2, since the fault is compensated for inside the SEVA™ process sensor, the reported VMV is a correct representation of the true measurand. Therefore the fusion block 22 finds all three measurements to be consistent and uses them all to calculate the CBE generated for output by the fusion block 22. The occurrence of the fault is then reflected in the value of the VU generated for output by the fusion block 22 and in the MV status generated for output by the fusion block 22 (determined by the change in MV status of the faulty process sensor).

FIGS. 12A–12F graphically illustrate Example 3 which shows the most important case, that is, when one SEVA™ process sensor fails to detect the fault and thus does not give a correct representation of the measurand.

The chain of events is as follows:

1. An undetected drift fault begins in the third process sensor at t=125 seconds.
2. The CBE output by the fusion block 22 begins to rise as long as the faulty value remains consistent with the rest.
3. From t=200 seconds to t=275 seconds the third process sensor becomes increasingly inconsistent with the other two process sensors (i.e. its Moffat distance from their combination is between 1 and 3). Accordingly, its influence diminishes, the CBE output by the fusion block 22 returns towards the true value and the uncertainty increases as reliance is placed on only two instead of three measurements.
4. Finally, the third process sensor is deemed by the fusion block 22 to be persistently inconsistent (Moffat distance>3) and the MV status of the output drops to CLEAR.

The results described above illustrate that the measurement fusion block 22 is capable of detecting and compensating for both detected and undetected faults in one of a set of independent SEVA™ process sensors. The VU of the CBE is increased accordingly to account for faults and, when this is necessary, the faulty process sensor is excluded from the calculation of the CBE. The CBE provided by the fusion block in these examples, such as fusion block 22, remains a correct representation of the measurand, and is smooth, while the MV status is free from jitter.

4. Process Metric Interpretation Block

Figure 13:
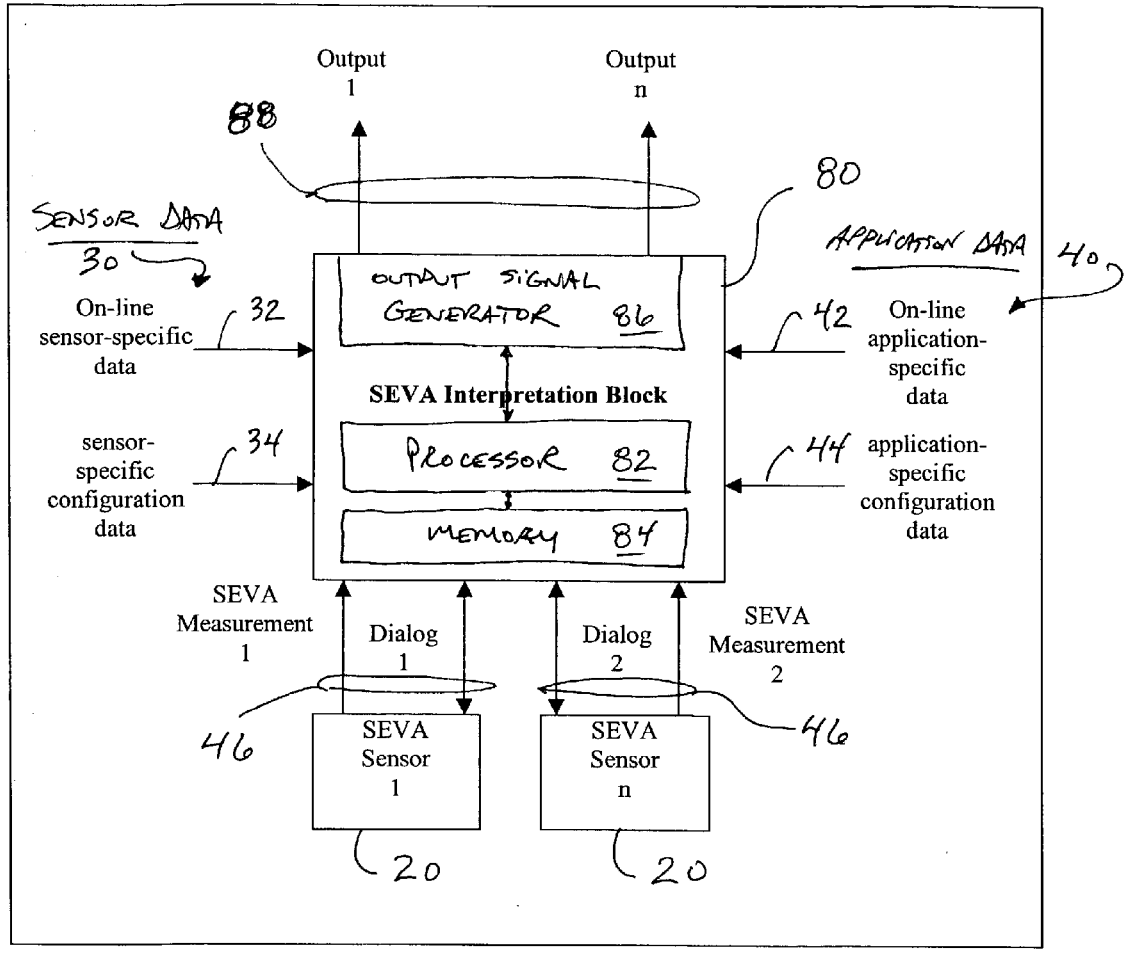
FIG. 13 is a diagram showing a process metric interpretation block operable to transform SEVA™ process metrics to a lower bandwidth output signal.

FIG. 13 shows a process metric interpretation block 80 connected to two SEVA™ process sensors 20. The interpretation block 80 receives SEVA™ process metrics (e.g. VMV, VU, MV status, and consistency flag data) from one or more process sensors 20 and maps the process metrics to any number of lower bandwidth output communication channels 88. The output signals may include simple alarm output based on predetermined or calculated thresholds, pulsed output, analog, 4–20 mA, etc. The interpretation block 80 includes a processor 82, a memory 84, and an output signal generator 86 that generates the appropriate output signal on the output communication channels 88. Many existing process controllers are designed to accept only lower bandwidth and/or binary input variables and thus are unable to process higher bandwidth SEVA™ process metrics. The interpretation block 80 provides a process to translate the higher quality SEVA™ measurement data into lower quality data that can be accepted and further processed by the process controller 10. The process implemented by the interpretation block 80 is described in greater detail below. As a result, the interpretation block 80 allows process control devices that generate SEVA™ process metrics to be used within process control systems that are unable to receive and/or process SEVA™ process metrics.

For example, a designer may need to monitor a process variable with an intelligent process sensor such as SEVA™ process sensor 20 because of its increased quality and reliability features. The designer also may need to communicate the same measurement of the process variable to separate process controllers; one being SEVA™ capable and one being incapable of processing SEVA™ measurement data. The process controller that is designed to receive and process SEVA™ measurement data can directly receive this data over a higher bandwidth communication channel, such as a digital fieldbus. A suitably configured SEVA™ interpretation block 80 can be connected between the SEVA™ process sensor 20 and a non-SEVA™ process controller that is incapable of processing SEVA™ measurement data. The interpretation block 80 functions to map the SEVA™ process metrics into a format that can be used by this non-SEVA™ process controller, such as an alarm when the uncertainty associated with a measurement becomes too large.

FIG. 13 shows additional details of the interpretation block 80 and its associated process sensors 20 that generate the measurement data or process metrics to be analyzed by the interpretation block 80. One or more process sensors 20 feed one or more process metrics into the interpretation block 80. The exchange of the measurement data occurs through a dialog over the communication lines 46. Each process sensor 20 is configured to execute its own dialog for communicating its process measurement data to the interpretation block 80. Additional input information also may be provided to the interpretation block 80 from each process sensor 20 and/or from other information sources, such as the process controller 10 or a global manufacturing facility controller (not specifically shown). This additional information may be fixed during configuration of the interpretation block 80, and may be updated dynamically during interpretation block processing. This additional input information includes process sensor information 30 and application information 40. The process sensor information 30 further includes on-line sensor-specific input data 32 and sensor-specific configuration input data 34. The application information 40 further includes on-line application specific input data 42 and application-specific configuration data 44. The sensor information 30 and the application information 40 assist the interpretation process executed within the interpretation block 80 in transforming the SEVA™ measurement data into suitable output that can be used by a non-SEVA™ process controller.

As the independent process metric are received from the process sensors 20, the interpretation block 80 processes and analyzes the measurement and uncertainty data, and produces output data and/or parameters based on the analyzed measurement and uncertainty data. Generally, the interpretation block 80 produces two classes of results. The first class of results are application-specific outputs, comprising any combination of discrete or continuous values, process metrics, arrays of the above, or instruction sequences. The second class of results produced by the interpretation block 80 are device specific dialogs with one or more of the process sensors 20 to extract additional information. These dialogs include requests for further diagnostic tests, requests for access to detailed diagnostic information, or instruction sequences for generating application-specific diagnostics.

As described above, the processor 82 within the interpretation block 80 is configured to execute several types of analysis processes to generate more complex result types as outputs, and to perform internal calculations. Examples of the result types and the corresponding calculations that may occur within the interpretation block 80 include simple classifiers, dialogs, and fuzzy variables.

Simple classifiers allow the interpretation and mapping process executed by the processor 82 to place the SEVA™ measurement data into application-specific categories such as "good/bad" or "good/bad/impaired." Examples of reasoning based upon the process metrics include: if/then rules based on MV status and/or device status; thresholding based on the magnitude of VU; thresholding based on VMV±VU (for example, its proximity to a set point or a process limit); or any combination of the above reasoning processes.

More elaborate decisions may be made by initiating a dialog between the interpretation block 80 and the process sensor 20 to extract more detailed information. For example, at the procurement and/or commissioning stage of a control system project, it may be determined that, for a particular process sensor type in a particular application, the compensation processes for some fault modes will be acceptable, while the compensation processes for other fault modes will not be acceptable.

This more detailed reasoning specification is not generally provided by the standard SEVA™ interface. For example, the interpretation block 80, upon receiving a BLURRED measurement, can use a dialog to request from the SEVA™ process sensor 20 the device specific diagnostic code, and can thereby determine whether the corrected measurement generated within the process sensor 20 is acceptable. Such decision making can feed into other thresholds on, for example, the magnitude of the uncertainty.

Another example of a dialog initiated by the interpretation block 80 is where other application-specific information 42 implies an undiagnosed problem within the process sensor 20. The interpretation block 80 can request further device specific tests, such as for example, current injection for a thermocouple, or an electrode test for a dissolved oxygen measurement, and can make further decisions based upon the results of those tests.

Figure 14:
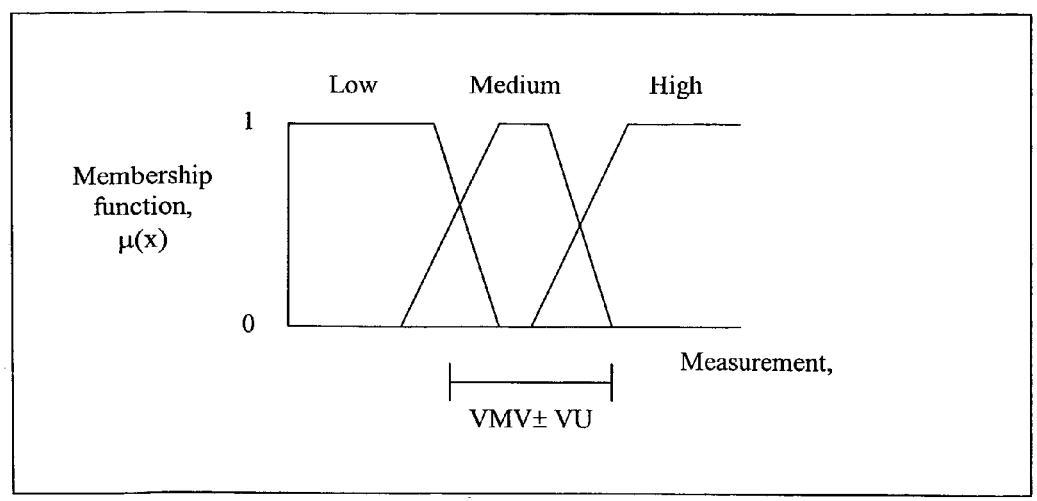
FIG. 14 is a graph representing a membership function associated with a fuzzy variable with process metric input.

The interpretation block 80 also is capable of executing fuzzy logic decision algorithms based upon fuzzy variables. Referring the FIG. 14, one example describing the use of fuzzy variables is to consider a set of fuzzy classifiers such as low, medium, high, each having corresponding membership functions $\mu_L(x)$, $\mu_M(x)$, and $\mu_H(x)$. The outputs of the membership functions may be fed into a fuzzy or neuro-fuzzy function, which may include a control, maintenance, or fault detection algorithm. Conventionally, each membership function is applied to each new measurement value x to determine the degree of correspondence between x and the low, medium and high classifiers. With a SEVA™ variable, weighting can be given to the uncertainty of the measurement value. For example, given a particular VMV±VU range, the process metric-weighted membership function $\sigma_L(VMV, VU)$ can be calculated using:

$$\sigma_L(VMV, VU) = \frac{\int_{VMV-VU}^{VMV+VU} \mu_L(x) \cdot P(x) \cdot dx}{\int_{VMV-VU}^{VMV+VU} P(x) \cdot dx}$$

where P(x) is an assumed probability density function for the uncertainty region, which may be for example, uniform, triangular, trapezoidal (computationally inexpensive) or normal (computationally expensive but theoretically preferable). Additional rules may be used to vary the membership function in response to changes in the MV status. The membership functions $\sigma_M(VMV, VU)$ and $\sigma_H(VMV, VU)$ may be calculated in a similar manner using the above formula and making the appropriate substitutions for $\mu_L(X)$.

The interpretation block 80 also can monitor alarms and/or significant change indicators (SCI). The bandwidth requirements for a SEVA™ device and the measurement information it generates may be too demanding, or may be unavailable for applications using low power, low speed or low technology communication media, such as a low bandwidth analog field communication bus. The interpretation block 80, particularly if it is integrated into a sensor device or field transmitter, may dramatically reduce the communication bandwidth requirement by flagging only significant changes (as determined by using predetermined or configurable, application-specific criteria) at the times that they occur. Within the interpretation block 80, an alarm or SCI flag may be triggered on the occurrence of, for example, a particular MV status or device status; a particular magnitude of VU; a particular thresholding on VMV±VU; or a particular rate of change of VU or VMV±VU.

Referring back to FIG. 2, the interpretation block 80 also may be included as an optional output stage within the measurement fusion block 22. In this implementation, the measurement fusion block 22 optionally may generate combined SEVA™ measurements as output on channel 26, or may generate a non-SEVA™ output by transforming the combined process metric data to the non-SEVA™ output on channel 88.

A number of implementations have been described. Nevertheless, it will be understood that various modifications may be made. Accordingly, other implementations are within the scope of the following claims.

What is claimed is:

1. A measurement processing system comprising:
   a first process sensor and a second process sensor, each of the first and second process sensors receiving a measurement signal related to an industrial control process and generating independent process metrics characterizing the same industrial control process; and
   a measurement fusion block connected to the first and second process sensors, the measurement fusion block being operable to receive the independent process metrics from the first and the second process sensors and execute a measurement analysis process to analyze the independent process metrics and generate a combined best estimate of the independent process metrics generated from the first and the second process sensors.

2. The measurement processing system of claim 1 wherein the measurement analysis process analyzes the independent process metrics to determine whether the independent process metrics are consistent with each other.

3. The measurement processing system of claim 2 wherein the measurement analysis process analyzes the independent process metrics to identify a consistent set of process metrics.

4. The measurement processing system of claim 2 wherein the measurement analysis process analyzes the independent process metrics to identify outliers within the set of independent process metrics.

5. The measurement processing system of claim 1 wherein the measurement fusion block includes a consistency analysis module operable to execute a consistency analysis process, the consistency analysis process analyzing the independent process metrics to determine whether the process metrics are consistent with each other.

6. The measurement processing system of claim 5 wherein the consistency analysis process receives two independent process metrics and calculates a Moffat consistency value to determine whether the two independent process metrics are consistent.

7. The measurement processing system of claim 5 wherein the consistency analysis process receives two independent process metrics and analyzes an overlap interval between the two independent process metrics to determine whether the two independent process metrics are consistent.

8. The measurement processing system of claim 5 wherein the consistency analysis process receives at least three independent process metrics and calculates a maximum clique parameter based on a linear search of the independent process metrics to determine how many of the at least three independent process metrics are mutually consistent.

9. The measurement processing system of claim 5 wherein the consistency analysis process receives at least three independent process metrics and calculates a maximum clique parameter based on an exhaustive search of the independent process metrics to determine how many of the at least three independent process metrics are mutually consistent.

10. The measurement processing system of claim 1 wherein the measurement fusion block includes a sensor fusion module operable to analyze the independent process metrics and combine the independent process metrics to generate the combined best estimate of the independent process metrics.

11. The measurement processing system of claim 1 wherein the process metrics include measurement data and uncertainty data.

12. The measurement processing system of claim 11 wherein the process metrics include a measurement status variable.

13. The measurement processing system of claim 1 wherein the measurement fusion block receives the independent process metrics and generates the combined best estimate value representing a set of fused process metrics and communicates the combined best estimate value to a control system.

14. The measurement processing system of claim 1 further comprising a third process sensor connected to the measurement fusion block, the third process sensor receiving a measurement signal from a transducer and generating a third process metric, and the third process sensor communicating the third process metric to the measurement fusion block.

15. The measurement processing system of claim 14 wherein the measurement analysis process analyzes the independent process metrics and the third process metric to determine whether the independent process metrics and the third process metric are consistent with each other.

16. The measurement processing system of claim 14 wherein the measurement analysis process combines the independent process metrics with the third process metric to generate the combined best estimate of the independent process metrics and the third process metric.

17. The measurement processing system of claim 14 wherein one of the first and second process sensors is a multivariable transmitter that generates three independent process metrics, and wherein at least two of the three independent process metrics are generated from measurement signals received from independent transducers monitoring the same process variable.

18. The measurement processing system of claim 1 wherein one of the first and second process sensors is a multivariable transmitter that generates at least two similar independent process metrics from measurement signals received from independent transducers monitoring the same process variable.

19. The measurement processing system of claim 1 wherein the first and second process sensors are multivariable transmitters that generate the independent process metrics from measurement signals received from independent transducers monitoring the same process variable.

20. A measurement processing system comprising:
a first process sensor and a second process sensor, each of the first and second process sensors receiving a measurement signal and generating independent process metrics characterizing the same industrial control process; and
a measurement fusion block connected to the first and second process sensors, the measurement fusion block being operable to receive the independent process metrics from the first and the second process sensors and execute a measurement analysis process to analyze the independent process metrics and generate a combined best estimate of the independent process metrics generated from the first and the second process sensors,
wherein the first process sensor is a self-validating sensor, and the independent process metrics include self-validated process metrics output by the first sensor.

21. The measurement processing system of claim 20 wherein the first and second process sensors are both self-validating sensors, and wherein both process sensors generate independent self-validation metrics.

22. The measurement processing system of claim 21 wherein each independent self-validation metric and the combined best estimate of the independent process metrics includes a validated measurement value, a validated uncertainty parameter associated with the validated measurement value, and a measurement value status indicator.

23. A measurement fusion block comprising:
a consistency analysis module operable to receive a first process metric characterizing an industrial control process from a first process sensor and receive a second process metric characterizing the same industrial control process from a second process sensor, the consistency analysis module configured to execute a consistency analysis process on the first and second process metrics to determine whether the first and second process metrics are consistent with each other; and
a sensor fusion module operable to receive the first and second process metrics from the first and the second process sensors, the sensor fusion module configured to execute a sensor fusion process to combine the first and second process metrics and generate a combined best estimate of the first and second process metrics generated from the first and the second process sensors, so that the combined best estimate provides an improved characterization of the industrial control process relative either to the first process metric or the second process metric.

24. The measurement fusion block of claim 23 wherein the consistency analysis process calculates a Moffat consistency value to determine whether the first and second process metrics are consistent.

25. The measurement fusion block of claim 23 wherein the consistency analysis process analyzes an overlap interval between the first and second process metrics to determine whether the first and second process metrics are consistent.

26. The measurement fusion block of claim 23 wherein the consistency analysis process receives at least three independent process metrics and calculates a maximum clique parameter based on a linear search of the independent process metrics to determine how many of the at least three independent process metrics are mutually consistent.

27. The measurement fusion block of claim 23 further comprising a processor operable to execute an uncertainty augmentation process to modify an uncertainty parameter associated with one or more of the process metrics.

28. A measurement fusion block comprising:
a consistency analysis module operable to receive a first process metric from a first process sensor and receive a second process metric from a second process sensor, the consistency analysis module configured to execute a consistency analysis process on the first and second process metrics to determine whether the first and second process metrics are consistent with each other; and a sensor fusion module operable to receive the first and second process metrics from the first and the second process sensors, the sensor fusion module configured to execute a sensor fusion process to combine the first and second process metrics and generate a combined best estimate of the first and second process metrics generated from the first and the second process sensors, wherein the first and second process metrics include measurement data and uncertainty data.

29. The measurement fusion block of claim 28 wherein the first and second process metrics include a measurement status variable.

30. A measurement processing system comprising:

a first process sensor and a second process sensor, each of the first and second process sensors receiving a measurement signal and generating independent process metrics;

a measurement fusion block connected to the first and second process sensors, the measurement fusion block being operable to receive the independent process metrics and execute a measurement analysis process to analyze the independent process metrics and generate a combined best estimate of the independent process metrics, wherein the first process sensor is a self-validating sensor, and the independent process metrics include self-validated process metrics output by the first sensor; and an interpretation block operable to receive the self-validated process metrics from the first sensor and map the self-validated process metrics to a lower bandwidth output communication channel.

31. A measurement fusion block comprising:

a consistency analysis module operable to receive a first process metric from a first process sensor and receive a second process metric from a second process sensor; and a sensor fusion module operable to receive the first and second process metrics, the sensor fusion module configured to execute a sensor fusion process to combine the first and second process metrics and generate a combined best estimate of the first and second process metrics, so that the combined best estimate provides an improved characterization of the industrial control process relative either to the first process metric or the second process metric, wherein the consistency analysis module is configured to execute a consistency analysis process on the first and second process metrics to determine whether the first and second process metrics are consistent with each other, the consistency analysis process including one or more of receiving two independent process metrics and calculating a Moffat consistency value to determine whether the two independent process metrics are consistent; receiving two independent process metrics and analyzing an overlap interval between the two independent process metrics to determine whether the two independent process metrics are consistent; receiving at least three independent process metrics and calculating a maximum clique parameter based on a linear search of the independent process metrics to determine how many of the at least three independent process metrics are mutually consistent; or receiving at least three independent process metrics and calculating a maximum clique parameter based on an exhaustive search of the independent process metrics to determine how many of the at least three independent process metrics are mutually consistent.

32. A measurement processing system comprising:

a first process sensor and a second process sensor, each of the first and second process sensors receiving a measurement signal related to an industrial control process and generating independent process metrics characterizing the industrial control process;

a consistency analysis module operable to receive a first process metric from a first process sensor and receive a second process metric from a second process sensor; and a sensor fusion module operable to receive the first and second process metrics, the sensor fusion module configured to execute a sensor fusion process to combine the first and second process metrics and generate a combined best estimate of the first and second process metrics, so that the combined best estimate provides an improved characterization of the industrial control process relative either to the first process metric or the second process metric, wherein the consistency analysis module is configured to execute a consistency analysis process on the first and second process metrics to determine whether the first and second process metrics are consistent with each other, the consistency analysis process including one or more of receiving two independent process metrics and calculating a Moffat consistency value to determine whether the two independent process metrics are consistent; receiving two independent process metrics and analyzing an overlap interval between the two independent process metrics to determine whether the two independent process metrics are consistent; receiving at least three independent process metrics and calculating a maximum clique parameter based on a linear search of the independent process metrics to determine how many of the at least three independent process metrics are mutually consistent; or receiving at least three independent process metrics and calculating a maximum clique parameter based on an exhaustive search of the independent process metrics to determine how many of the at least three independent process metrics are mutually consistent.

* * * * *